United States Patent
Falls et al.

(10) Patent No.: US 7,287,001 B1
(45) Date of Patent: Oct. 23, 2007

(54) ELECTRONIC PRODUCT INFORMATION DISPLAY SYSTEM

(75) Inventors: S. Douglas Falls, St. Charles, IL (US); Ernest J. Dale, Waterford, VA (US); Rod Matheson, Columbia, MD (US)

(73) Assignee: IPMS, Inc., Sterling, VA (US)

(*) Notice: Subject to any disclaimer, the term of this patent is extended or adjusted under 35 U.S.C. 154(b) by 0 days.

(21) Appl. No.: 08/983,394

(22) PCT Filed: Jul. 31, 1996

(86) PCT No.: PCT/US96/12575

§ 371 (c)(1), (2), (4) Date: Aug. 5, 2002

(87) PCT Pub. No.: WO97/05556

PCT Pub. Date: Feb. 13, 1997

Related U.S. Application Data

(60) Provisional application No. 60/001,673, filed on Jul. 31, 1995.

(51) Int. Cl.
*G06G 1/14* (2006.01)
*G06Q 20/00* (2006.01)

(52) U.S. Cl. .............. 705/22; 705/23; 705/28; 705/20; 705/21; 235/383; 235/385; 340/5.91; 340/825.49; 345/1.1

(58) Field of Classification Search .............. 705/22, 705/23, 28, 20, 21; 235/383, 385; 340/5.91, 340/825.49; 345/1.1
See application file for complete search history.

(56) References Cited

U.S. PATENT DOCUMENTS 4,962,466 A * 10/1990 Revesz et al. .......... 705/14

(Continued)

FOREIGN PATENT DOCUMENTS

WO    WO 92/05415    * 4/1992

OTHER PUBLICATIONS

Esler, B. "Commercial shops eye packaging", Graphic arts monthly, vol. 67 No. 10, p. 75, Oct. 1995.*
Reiter, J. "Smart packaging", Dairy Foods, vol. 91 No. 3, p. 54, Mar. 1990.*

Primary Examiner—F. Zeender
Assistant Examiner—Christopher Buchanan
(74) Attorney, Agent, or Firm—Pillsbury Winthrop Shaw Pittman LLP

(57) ABSTRACT

The invention discloses a printed label and a display shelf for a business establishment, including a display shelf having a length and at least one area on which at least one product is to be placed. The area has a length and a depth. The label includes product information printed thereon for identifying the at least one product for display on the shelf, and first and second space indicators for indicating a position, corresponding to a portion of the length of the shelf, at which the at least one product is to be placed. The label is constructed and arranged to have a predetermined length that is coextensive with the portion of the length of the area of the shelf on which the at least one product is to be placed. The first and second space indicators define the predetermined length. The first space indicator indicates where the portion of the length of the area of the shelf begins and the second space indicator indicates where the portion of the length of the area of the shelf ends.

61 Claims, 15 Drawing Sheets

U.S. PATENT DOCUMENTS

| | | | |
|---|---|---|---|
| 5,111,196 A * | 5/1992 | Hunt | 340/5.91 |
| 5,111,943 A * | 5/1992 | Ramey | 211/59.4 |
| 5,172,314 A * | 12/1992 | Poland et al. | 705/1 |
| 5,241,467 A * | 8/1993 | Failing et al. | 705/1 |
| 5,299,116 A * | 3/1994 | Owens et al. | 705/28 |
| 5,382,779 A * | 1/1995 | Gupta | 235/383 |
| 5,383,111 A * | 1/1995 | Homma et al. | 705/27 |
| 5,388,158 A * | 2/1995 | Berson | 713/176 |
| 5,423,617 A * | 6/1995 | Marsh et al. | 400/82 |
| 5,465,085 A * | 11/1995 | Caldwell et al. | 340/5.91 |
| 5,537,312 A * | 7/1996 | Sekiguchi et al. | 705/14 |
| 5,575,100 A * | 11/1996 | Marvin et al. | 40/642.02 |

\* cited by examiner

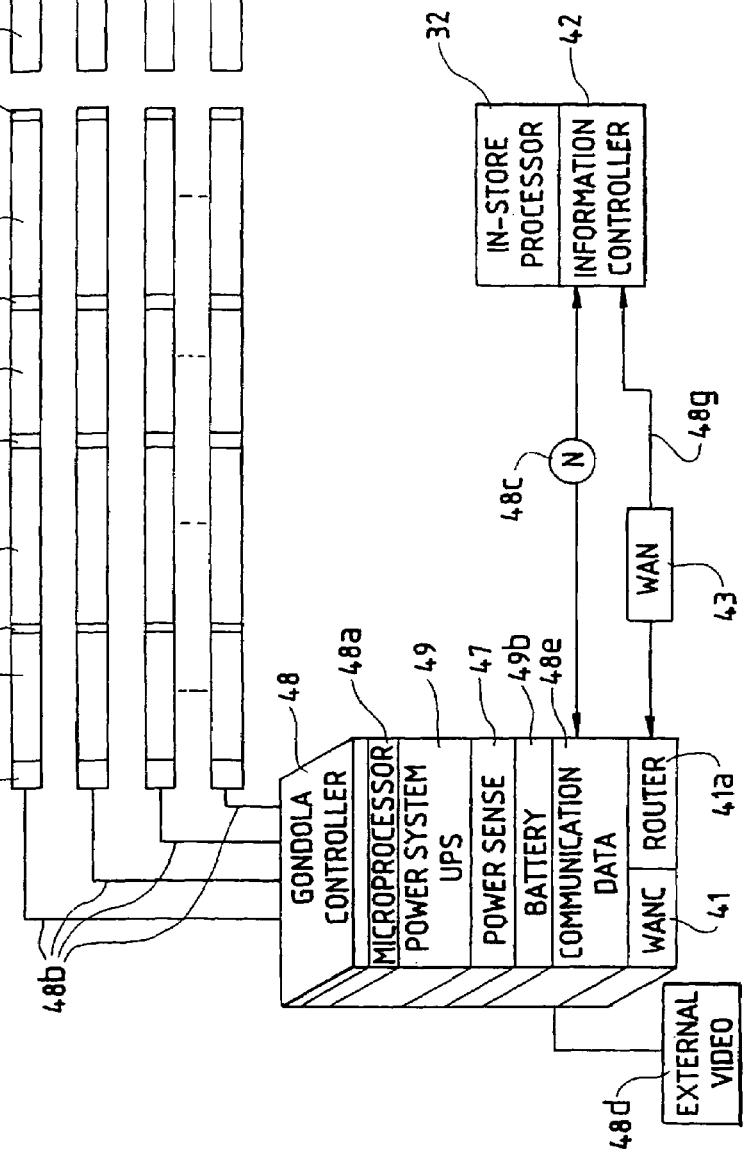

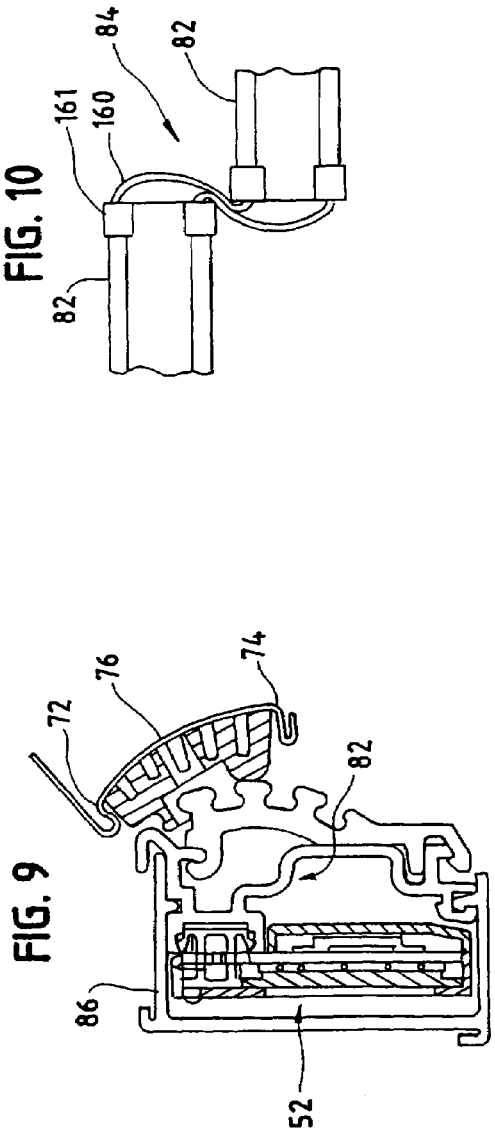
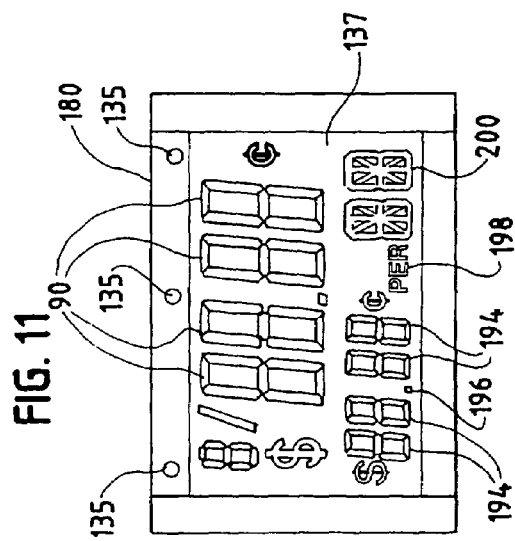
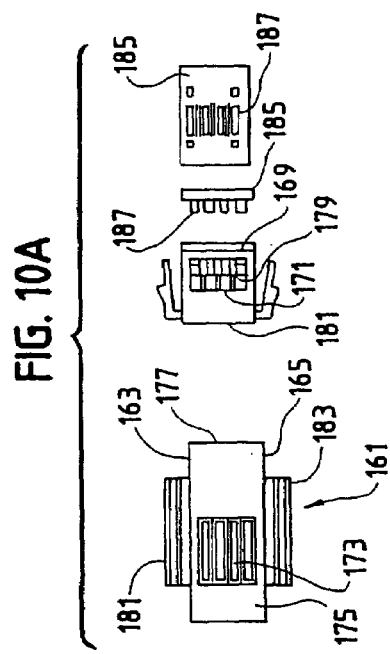

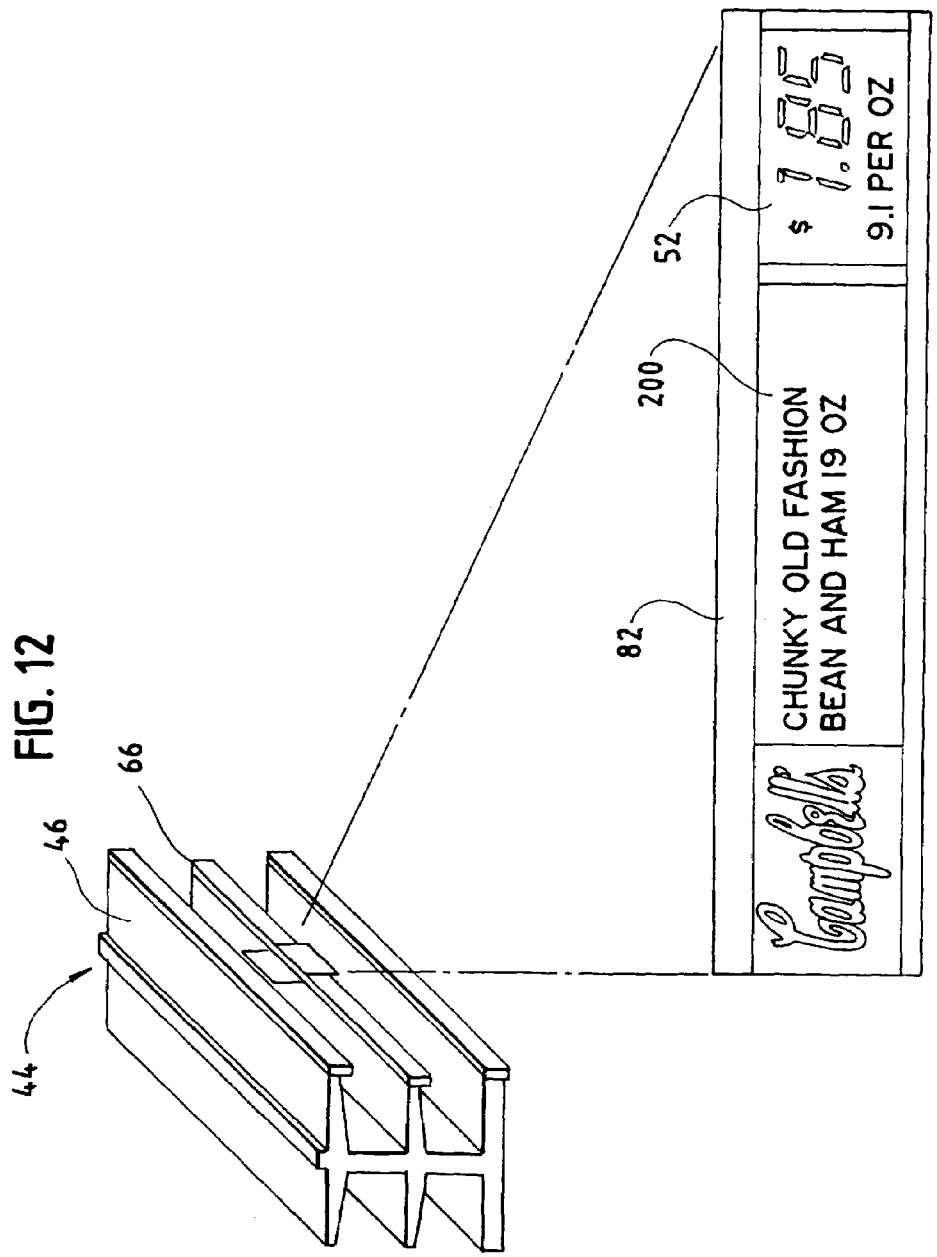

FIG. 18

LABEL EDITOR OPTIONS

TEMPLATE PROPERTIES
- HEIGHT: 3.0"
- WIDTH: 10.0"
- BKGND COLOR: WHITE

HORIZ LINE PROPERTIES
- WIDTH: 2
- LENGTH: 10.0"
- COLOR: RED
- ELASTIC: NO

PDM PROPERTIES
- MODEL:

RECTANGLE PROPERTIES
- HEIGHT: 3.0"
- WIDTH: 10.0"
- INTERIOR COLOR: WHITE
- CORNERS: ROUND
- LINE WIDTH: 2
- LINE COLOR: BLACK
- ELASTIC: NO
- INVISIBLE: NO
- MAX. STRETCH: OFF
- DUPLICATE: OFF

VERTICAL LINE PROPERTIES
- WIDTH: 2
- LENGTH: 10.0"
- COLOR: RED

BAR CODE PROPERTIES
- HEIGHT: 0.5"
- SHOW TEXT: YES
- SOURCE:

TEXT FIELD PROPERTIES
- HEIGHT: 2
- WIDTH: 10.0"
- COLOR: BLACK
- ITALIC: OFF
- BOLD: OFF
- ALIGNMENT: LEFT

GRAPHIC PROPERTIES
- ALIGNMENT: LEFT
- TYPE: FIXED
- SOURCE:

ELECTRONIC PRODUCT INFORMATION DISPLAY SYSTEM

This application is a Continuation In Part of Provisional Appn. Ser. No. 60/001,673 filed Jul. 31, 1995.

A portion of the disclosure of this patent application contains material which is subject to copyright and maskwork protection. The copyright and maskwork owner has no objection to the machine reproduction by anyone of the patent document or the patent disclosure as it appears in the United States Patent and Trademark Office files or records, but otherwise reserves all copyright and maskwork rights whatsoever.

FIELD OF THE INVENTION

The invention relates to a product information system and particularly, a product information system that provides a link between the shelf edge and store applications.

BACKGROUND OF THE INVENTION

In the past price display systems consisted of a paper price label affixed to items of merchandise sold in grocery stores so that customers could easily determine the price of each item. At the check-out stand the price of each item was manually entered by clerk into a conventional register. Also, with this completely manual system keeping track of stock and planning of a store's layout was very costly in terms of personnel, resources and money. Since the development of point-of-sale ("POS") checkout terminals, optical scanners, and computers, the price label has almost universally been eliminated and replaced by a product code, termed a Universal Product Code ("UPC"), or a Stock Keeping Unit ("SKU"). These UPC or SKU codes are easily read by an infra-red scanner and a computer of which prompted the development of computerized systems that could handle and manipulate the product data. However, the codes are not easily read by customers, proposing the need to display product information such as price on the product itself or on an adjacent shelf.

Several systems have been developed coordinating the UPC and SKU codes with the price labels in an attempt to fully integrate a computer controlled system providing product information integrity in the areas of space management, audit capabilities and price changes, while still giving customers the product information suited to their shopping needs i.e. price, savings, and sales. Unfortunately, many of these systems are incompatible with existing systems, expensive, and all fail to fully integrate an effective control system providing space management, audit capabilities and rapid price changes while maintaining product information integrity.

In attempting to solve the product information integrity problems associated with the sole use of paper price labels, various electronic displays, employing liquid crystal displays ("LCD") and light emitting diodes ("LED"), located at the shelf have conventionally been used to display price information. When a price change is desired, the new price can be updated in a computer database, linked to the checkout terminals, and then sent to the electronic display. These electronic displays at least have the advantage of updating price information at the shelf, however without two-way communication, between the electronic display and the computer managing the price information database, price integrity at the shelf cannot be assured. Also, prior art systems cannot specifically identify the unique location of each product in the store.

For example, U.S. Pat. No. 4,002,886, issued to Sundelin, generally describes a system using electronic display modules located at the shelf linked with a central computer, of which also supplies information to the POS terminals. Sundelin's display system has several disadvantages. First, the modules are hard wired, making alterations to shelf and product location difficult and expensive. Second, the modules are wired in parallel making wiring layout for the store virtually unmanageable. Third, communication with the modules is only one-way, generally limiting the systems capability to provide price integrity at the shelf edge.

To overcome the disadvantages of hard wiring, other commercial display systems utilized infra-red or radio broadcast (RF) communications, however both infra-red and RF exhibit certain problems. For example, U.S. Pat. No. 4,821,291, issued to Stevens describes a system using an RF broadcast system to provide two-way communication with the individual display modules. This system overcomes the hardwiring problems, however several other problem arise that affect both the information integrity and the cost of the system. For example, this RF broadcast system is not interference resistant creating problems with the integrity of the price display information even though the display modules may communicate with the main computer.

Steven's display modules are individually battery powered, creating on-going problems with the replacement of those batteries and limits the ability of the system to rapidly determine whether a module is functioning or not. The RF circuitry contained within the display modules greatly increases the cost of implementing such a system of 10,000 or more display modules. Also, this system maintains problems with the speed at which to update pricing information at the display module because a central computer has to access each module individually by a long polling process. Further, this system can not fully integrate a computer controlled system providing space management, audit capabilities and price changes while maintaining product information integrity.

A number of factors have made retail store management more difficult in recent times, including narrowing profit, increasing expenses, increasing labor costs, unavailability of desired education and skill levels in employees, and the proliferation of retail brands and products within brands. Due to these and other factors, those managing retail stores, particularly grocery stores, have given much attention in recent years both to reducing the cost of fulfilling existing store practices, and to developing new store practices.

One known store practice is the "price audit". In the simplest case, a store that practices manual price auditing will have a list of expected prices, and on a particular day a store employee will be given a portion of the list. The employee is instructed to locate each item from the list in its actual store location, where the price will be checked. In a store where prices are marked on the goods, the marked prices are compared with the price on the list. In a store where prices are posted or displayed nearby to the goods, the posted or displayed price is compared with the list price. Despite the great labor cost involved, management at most large grocery chains will choose to perform manual price auditing on a more or less continuous basis. The management goal is typically that every price will have been audited at least as often as, say, once per quarter.

For many reasons, manual price auditing is less than perfect. It sometimes happens that a product is displayed in multiple store locations, for example, yet the person performing the audit will not necessarily know to continue searching after one occurrence of an item has been found.

Thus, second or third locations of an item will miss having the price audited. Also, on a given day the employee performing price auditing will have a list of items to check, and the sequence of items on the list will typically not match the physical arrangement of items on display, so that each item on the list requires a search for the physical item in the store.

Another known store practice is the establishment of plan-o-grams. In a store that has established plan-o-grams, every section of shelving is memorialized, typically in list form, regarding placement of each item of merchandise. Theoretically, nothing is left to chance in a store that has established plan-o-grams; there is a place for everything and everything is in its place. As a practical matter, it is a ponderous task to establish plan-o-grams for a chain of retail stores. Each new product announcement by a manufacturer represents the prospect of having to update or change the plan-o-grams, as does the discontinuance of a product. At the level of an individual store, it is very easy for the physical store layout to deviate from the arrangement set forth in the plan-o-grams, whether due to inadvertence or otherwise.

Furthermore, while most stocking is performed by store employees, some lines of goods are traditionally stocked by representatives of the manufacturers, who have a natural incentive to stock goods in such a way as to promote sales of the goods of their employers. One variable that stores attempt to control is the number of "facings" of each product. A particular manufacturer would prefer, of course, that its products each enjoy a large number of facings, and that the products of its competitors have very few facings. Another variable is the shelf location. Every manufacturer would prefer that its goods be at eye level, yet not all the store shelves are at eye level. Yet another variable to be controlled is the adjacency of particular pairs of products or of product categories.

While the particular locations, facings, and adjacent goods within a store are all important, it is of even greater importance that store management be capable of ensuring that the store at least contains the goods that are desired to be present in the store. To that end, management will often maintain a "shelf set", a list of items that are expected or desired to be found in each store. While a manual audit could be performed to confirm that each item on the shelf set list is in a store, it is desirable that store management be able to identify exceptions in a routine, non-labor-intensive, automated way.

In addition to the identities of items of merchandise, the shelf set may also include information as to the desired number of facings for each item. It is very labor-intensive to confirm manually that for each item in a store, the actual number of facings matches the desired number. Thus, prior artisans have focused on the provision of an automated or nearly automated way to determine the extent to which actual facings correspond to desired facings.

U.S. Pat. No. 5,241,467, issued to Failing et al. discusses an attempt to provide space management and auditing capabilities coordinated with a computer controlled electronic display system. The system utilizes rails mounted on the shelf edge that provide display module location within a 4 foot space. Communication between the rails and a central computer could be accomplished by RF, infra-red or hard wire. The space management system of Failing et al. includes electronic price display labels mounted on rails along the edges of shelves in a store. A store computer in the store communicates with the labels by an synchronous serial data link. The communications link between the computer and the labels permits the computer to address each label by a logical address and to determine the physical location of each label to within a resolution of typically four feet.

The system provides price audit lists that permit economical use of the time of store personnel during the audit. The lists are generated in such a way that the items on a particular list are physically contiguous; thus once the correct general area has been located by the auditor little additional time need be spent locating the individual items. The store personnel are able to predetermine the criteria according to which audit lists are prepared, and can adjust the criteria over time.

In this system adjacency audit lists may also be prepared. In each entry of such a list, the entry will communicate that it is desired for two particular items to be adjacent in store shelf display. The auditor is expected to locate the two items and to confirm that they are physically adjacent.

In each of these audit processes, the auditor reports the exceptions that were found; theoretically there would never be exceptions and in actuality it is hoped there are very few exceptions. In the space management system according to this system the auditor is able to provide the exceptions by a streamlined data input procedure; if performed at a keyboard, the number of required keystrokes is kept to a minimum.

In this space management system the tedious task of auditing product facings is made easier, and the danger that exceptions might be overlooked is lessened. In performing an audit of product facings, the user is able to use the display hardware, i.e. the electronic price label, including the push-button on each label, as a data collection system for product facing information. This eliminates the multiplicity of manual writing, copying, and keying steps in prior art ways of auditing product facings. The space management system of Failing et al., however, fails in several ways. The adjacency lists generated by the system merely shows that two products are simply adjacent thus problems with shelf location are inherent. Merely knowing the adjacent products does not eliminate the risk that competitors will move in to the space of other competitors. This form of auditing is still very tedious and time consuming, thus costly. The plan-o-gram auditing that is discussed does not change the method of auditing and planning of a store because the plan-o-gram method discussed is merely a list of adjacent products of which maintains problems with the ability to update and maintain a store plan and product information integrity is at risk. The resolution of this system is four feet obviating an inherent error in space management. Also, the modules that are employed must have complicated user functionality via push buttons which raise the cost of the system employing large numbers of complex modules, each of which must be individually and tediously visited by store personnel. The Failing et al. system therefore can not set forth a fully integrated computer controlled system providing space management, audit capabilities and rapid price displays while maintaining product information integrity.

SUMMARY OF THE INVENTION

The retail industry has changed dramatically in the last few years. Information, technology and fierce competition have mandated fundamental changes in the operational strategies of successful retailers. The new model for retail success is built upon speed, efficiency and flexibility. It requires the ability to identify, implement and integrate information and technology that will facilitate cost efficiency and create a more pleasurable shopping experience for the consumer. The ability to effectively execute state-of-the-art, in-store automation strategies has become a point of differentiation for successful retailers.

The product information system of the present invention provides such a automatic strategy. The product information system, among other things, uniquely automates and integrates the following three functions: real-time information display, dynamic printed information display, and shelf space management. The in-store product information system of the present invention provides a link between the shelves where products are displayed and in-store applications such as a POS database system, shelf space planning systems, advertising and other in-store applications. This novel product information system manages and optimize information at the shelf edge to create a competitive advantage for retailers including increased productivity, greater consumer confidence, enhanced image and lower operating costs.

To accomplish the above, the product information system utilizes and coordinates, the operation of multiple information devices including real-time information display modules, high quality printed shelf edge labels, hand held input devices, in-store processors, printers and the ability to dynamically track the store system configuration in an extremely rapid manner.

Specifically, the present invention provides a product information system including an information controller that interfaces with other store operations such as the POS database system and a space planning system. The information controller communicates with gondola controllers, buses and store shelf modules thereby enabling real-time product information to be viewed at the shelf. The information controller interfaces with the item database system to transmit product information to a gondola controller via a bus to modules that display the information. Each module has a unique address and includes a microcontroller and a visual display. The modules are secured to the shelf edge via back planes or rails and associated connectors. When a module is first added to the system, the module is electronically registered so that the information controller can correlate that module address to a particular product's UPC code.

The health and status of the modules, busses and gondola controllers (each of which has back up power) are continuously monitored by the system and any problem is rapidly detected and reported to the information controller. The gondola controllers, busses and modules support as-needed product information changes that among other things, insure price integrity between the check-out terminals and the shelves by implementing real-time product information changes automatically when the product information such as price is changed in the database system of the invention. The modules have the ability to sense and display ambient temperature, a real benefit in cold storage locations such as freezer compartments, etc.

The product information system also includes a shelf edge label printing system that interfaces store operations with the space planning system to design, format and produce high quality printed shelf edge for each product. Each label includes indicia such as infrequently changing product information and advertising. The label for each product is as long as the amount of space as the number of facing products take up on the shelf. The labels are secured to the shelf edge. The labels for adjacent products can be printed together in a strip. Such labels and strips act as a plan-o-gram to assist store personnel in arranging the products on the shelves and prevent deviation from the shelf plan. The labels can also indicate where to position the modules.

In the alternative, the present invention could be utilized without using the modules, and rely on the high quality graphic product information printed for shelf edge display by the novel information handling and printing ability of the instant invention.

The present invention also can be integrated into a wide area network (WAN) such as that provided by the World-Wide Web (WWW) and communications provided by the Integrated Services Digital Network (ISDN). Thus, the product information system could communicate with other product locations or stores with like ability anywhere in the world.

Further, the present invention can utilize shelf display modules having video ability. Such modules could then display advertising information, or any type of product information as desired.

Other features and advantages of the invention will become apparent to those of ordinary skill in the art upon review of the following detailed description, claims, and drawings.

BRIEF DESCRIPTION OF THE DRAWINGS

FIG. 4 is a sectional view of a bus used on the back plane;

FIG. 5 is a block diagram of the gondola and gondola controller configuration;

FIG. 9 is a sectional view of a shelf unit and module secured to a gondola shelf showing another embodiment of a variable angle connector;

FIG. 10 is a front view of a flexible mating ribbon interconnector and plug;

FIG. 10a is a top and end perspective view of an bus interconnector according to the present invention;

FIG. 11 is plan view of a module display;

FIG. 12 a perspective view of a gondola and an enlarged view of a product label and module secured thereto;

FIG. 18 is a view of the graphical representation of a label editor options display.

Figure 1:
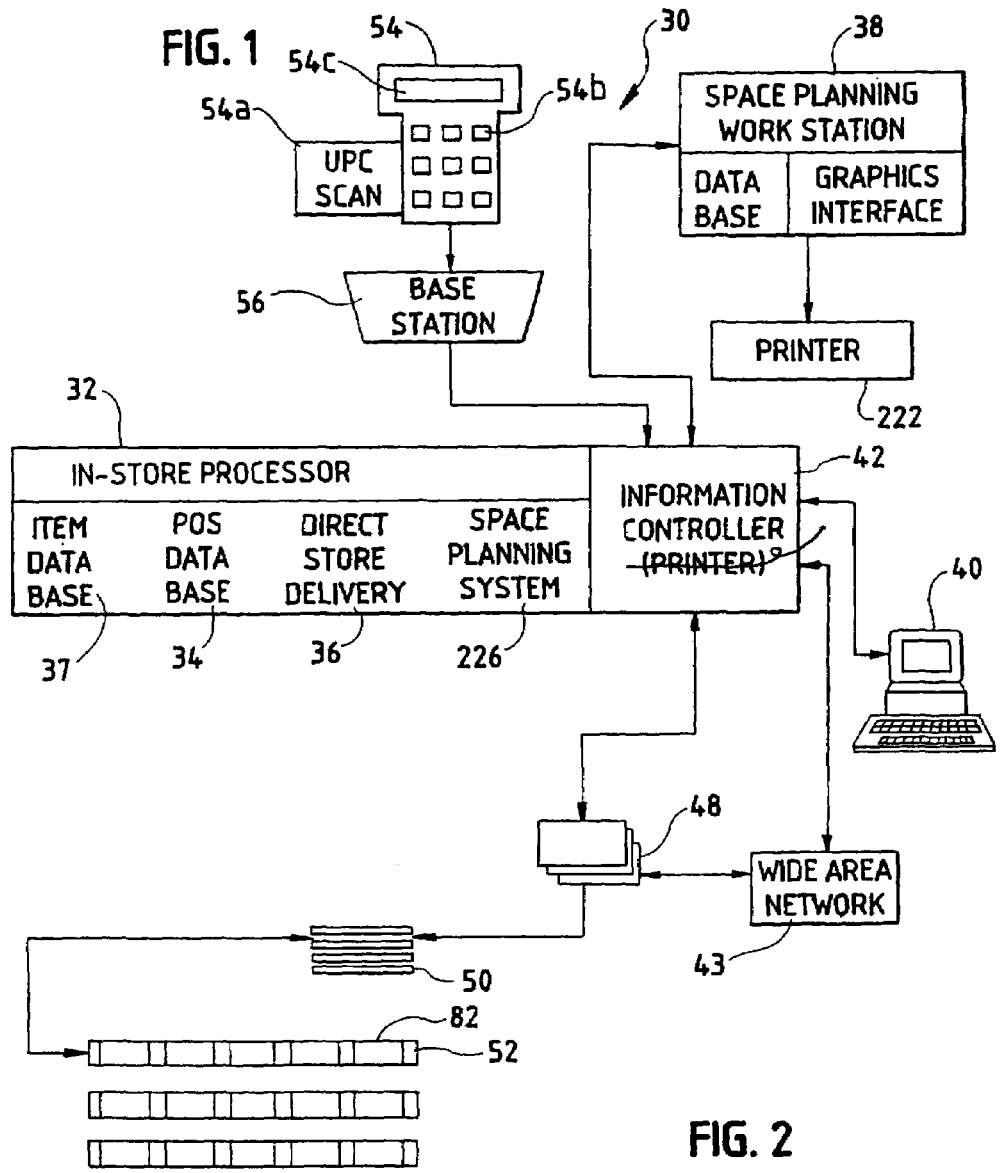
FIG. 1 is a block diagram of the product information system embodying the invention.

Before a preferred embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1 a product information system 30 embodying the invention. The product information/system 30 is particularly useful for retail operations such as grocery stores and will be described in that environment. However, it should be noted that the product information system 30 is applicable for other applications such as wholesale locations and numerous other environments in which product information is desired to be displayed.

The product information system 30 manages point-of-purchase product supports such as shelves by providing two formats of information at the shelf: real-time information and customized, dynamic printed information. By providing real-time information such as product price and price/unit at the shelf, there is 100% integrity between the price the consumer is charged at the check-out terminal and the price as shown at the shelf. This supports frequent price changes with minimal personnel effort and cost. Product information that changes infrequently, such as product description, UPC code, nutritional information and advertising, is displayed on the high quality printed labels. The labels and the strips improve the aesthetic appearance of the shelves and enhances the consumer shopping experience.

The product information system 30 includes an in-store processor 32 that is typically present in retail stores. The in-store-processor usually includes an item database 37. The in-store processor 32 also includes, or interfaces to, store applications such as the POS database system 34, direct store delivery (DSD) operations 36, and the like. In particular, the POS database system 34 is responsible for maintaining the POS database of product information which is a source of product information for each product that interfaces with the check-out terminals 40. The POS database system interfaces with the check-out, terminals 40 to supply product information such as product price to the check-out terminals 40 when the UPC code for a product is scanned. The POS database system 34 can be any conventional system such as, for example, those manufactured by IBM™, NCR™, or ICL™.

A space planning system 226 operating via a space planning workstation 38 interfaces with the in-store processor 32 and enables personnel to plan the lay out of products on various product supports such as shelves. The space planning workstation 38 includes various conventional information databases as well as a graphical user interface (described hereinbelow in detail). One of the databases is a database of product dimensions (not shown). Space planning workstations such as this are commonly used throughout the retail industry and include any conventional system such as SPACEMAN™ by AC Nielson™, Chicago, Ill., APOLLO™ by Information Resources™, Inc., Chicago, Ill., or INTACTIX™ by Intactix™ in Irving Tex.

The product information system 30 of the present invention interfaces with store operations such as the POS database system 34. One method by which to interface the product information system 30 with the other store operations is, for example, via the use of ChainTrack™ System from Telxon Corporation of Akron, Ohio. The ChainTrack™ System integrates and shares information among the various retail store applications and devices for retail operations. Through the use of the ChainTrack™ System, the product information system 30 uses ChainTrack's already established interfaces to the other store systems especially the interface (not shown) to the POS database systems 34. Alternatively, the product information system 30 could utilize other interfaces to various other store operations.

The product information system 30 oversees at least two different formats of product information—namely real-time information and, printed information. The product information system 30 interfaces with the item database 37 to access product information such as product name, UPC code, price and the like. Via a communication system which will later be discussed, the product information system 30 communicates real-time product information to shelves 46 (FIG. 2) where the products are located.

Further, the product information system 30 utilizes the graphic edge creation system 227 (FIG. 14), either at the store or at another location, to generate the printed labels of product information to be displayed at the shelves. The present invention, using this same information can enable a print-out of product location for store customers on demand.

Figure 2:
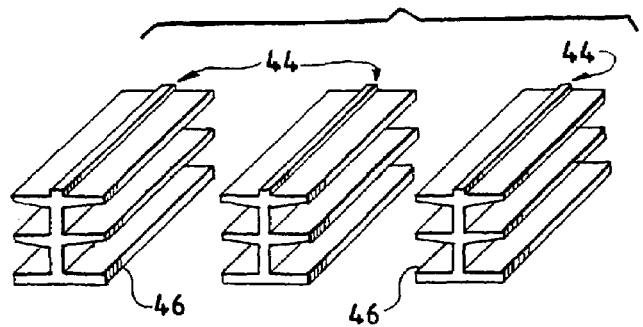
FIG. 2 is a perspective view of retail store gondolas.

Referring now exclusively to the product information system's real-time information mode, the product information system 30 includes an information controller 42 for specifically controlling the display of real-time information at the shelf 46. The information controller 42 is preferably resident at the in-store processor 32. As is shown in FIG. 2, the typical layout of a retail store is depicted as including a plurality of gondolas 44 having numerous product supports such as shelves 46 on each side of the gondolas 44. Typically, the shelves 46 of the gondolas 44 are segmented into four foot sections. As shown in FIG. 1, to communicate information to the shelves 46, the information controller 42 communicates with gondola controllers 48, busses 50 and display modules 52 to send and receive product information to and from the shelves 46 (FIG. 2).

Figure 3:
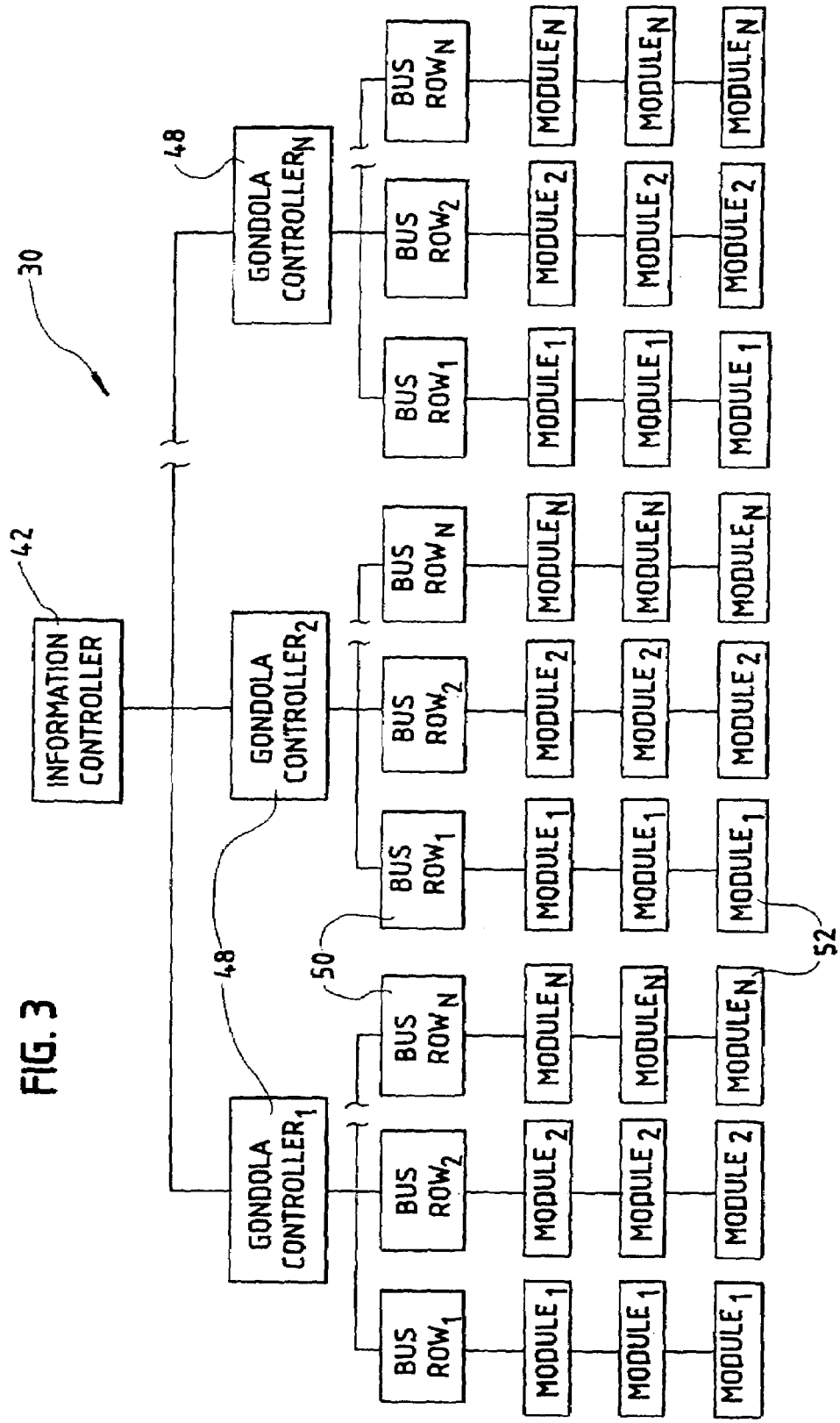
FIG. 3 is a block diagram of a portion of the product information system.

As shown in FIG. 3 in light of FIG. 2, the product information system 30 utilizes a gondola controller 48 for each gondola 44 (FIG. 2) present in the store. The gondola controllers 48 control the activities on each of the shelves 46 (FIG. 2) on both sides of that gondola 44 (FIG. 2). Alternatively, there could be one gondola controller for more than one gondola. Turning to FIG. 5, the gondola controller 48 is preferably of a RISC architecture utilizing a microprocessor 48a and includes, for example, 16 serial ports 48b, a communication network connection 48e, a power system 49, including monitoring and control means 47, current limiting means, and ability for an uninterrupted power supply (UPS) 49a (FIG. 5) for each gondola controller 48, and up to sixteen busses 50.

Referring back to FIG. 1, the information controller 42 and the various gondola controllers 48 communicate with each other via a wireless network (not shown) such as, for example, that manufactured by Telxon™, Symbol™, or Norand™ with a base station 56 linked to the in-store processor 32 for spread spectrum communication. The communication network also supports the use of hand-held terminals (HHTs) 54 which communicate with the base station 56 linked to the in-store processor 32 via the spread spectrum network. Alternatively, the information controller 42 and the gondola controllers 48 can be hard wired for standard ethernet communication, as hereinbelow set forth in detail.

To communicate with each shelf 46 of its gondola 44, each gondola controller 48 utilizes a bus 50 having power 138, ground 140, data+ 142 and data− 144 lines, (FIG. 4) that runs the length of the shelf 46. The bus configuration is generally as depicted in FIG. 5 where typically, there are on average eight shelves 46 per side of the gondola 44 therefore sixteen busses are utilized. The busses 50 provide a two-way serial communications link (serial port 48b), between the gondola controllers 48 and the modules 52 to process and display the product information.

Figure 6:
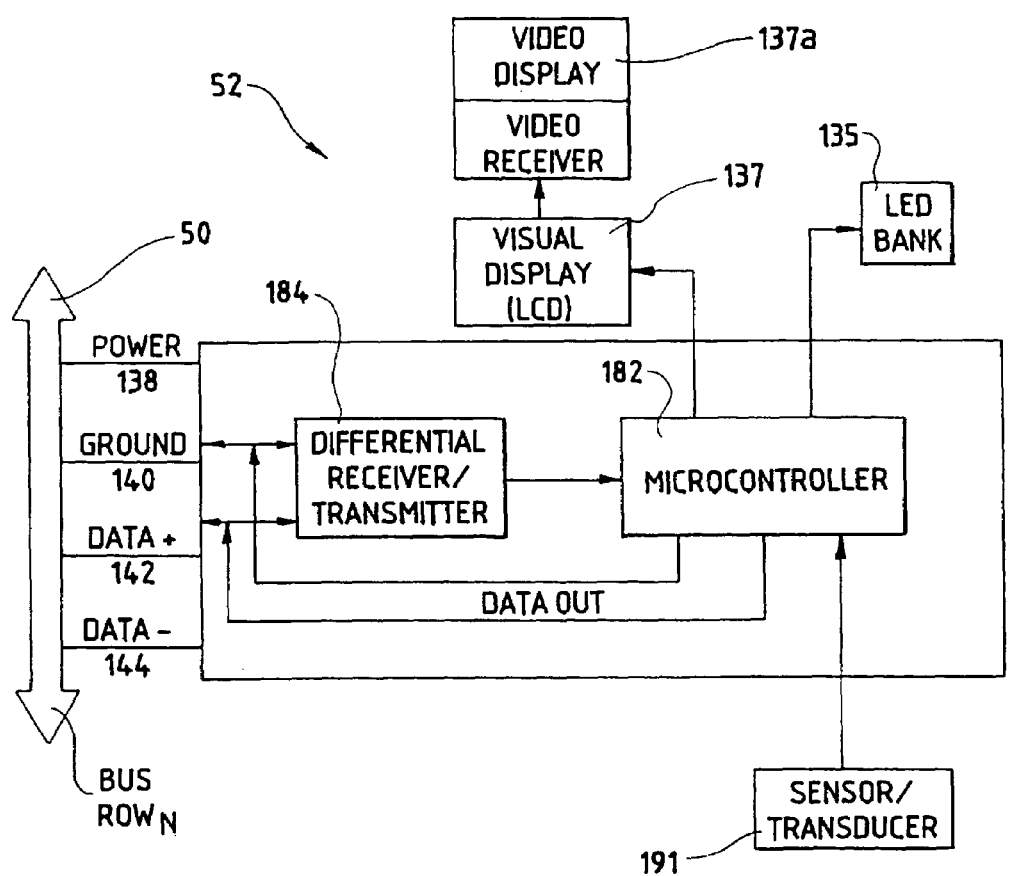
FIG. 6 is a block diagram of the circuit of a display module.

As shown in FIG. 6, the bus 50 has four lines: power 138, ground 140, data+ 142 and data− 144. The two data lines 140, 142 operate differentially for good noise immunity over long runs. Each gondola controller 48 includes a source of back-up, power. Uninterruptive power source (UPS) 49a (FIG. 5) includes power sensor 47 which monitors power level and automatically switches to its battery 49b for battery power when power level drops below a predetermined level. Typically, power line 138 carries an average level of 13 volts D.C. Battery back-up power level is approximately 12 volts D.C.

The basic architecture of the display module 52 uses a differential receiver/transmitter 184 to communicate between the bus 50 and the microcontroller 182. The microcontroller 182 then is able to display product information on the LCD display 137 and the LED's 135.

Figure 7:
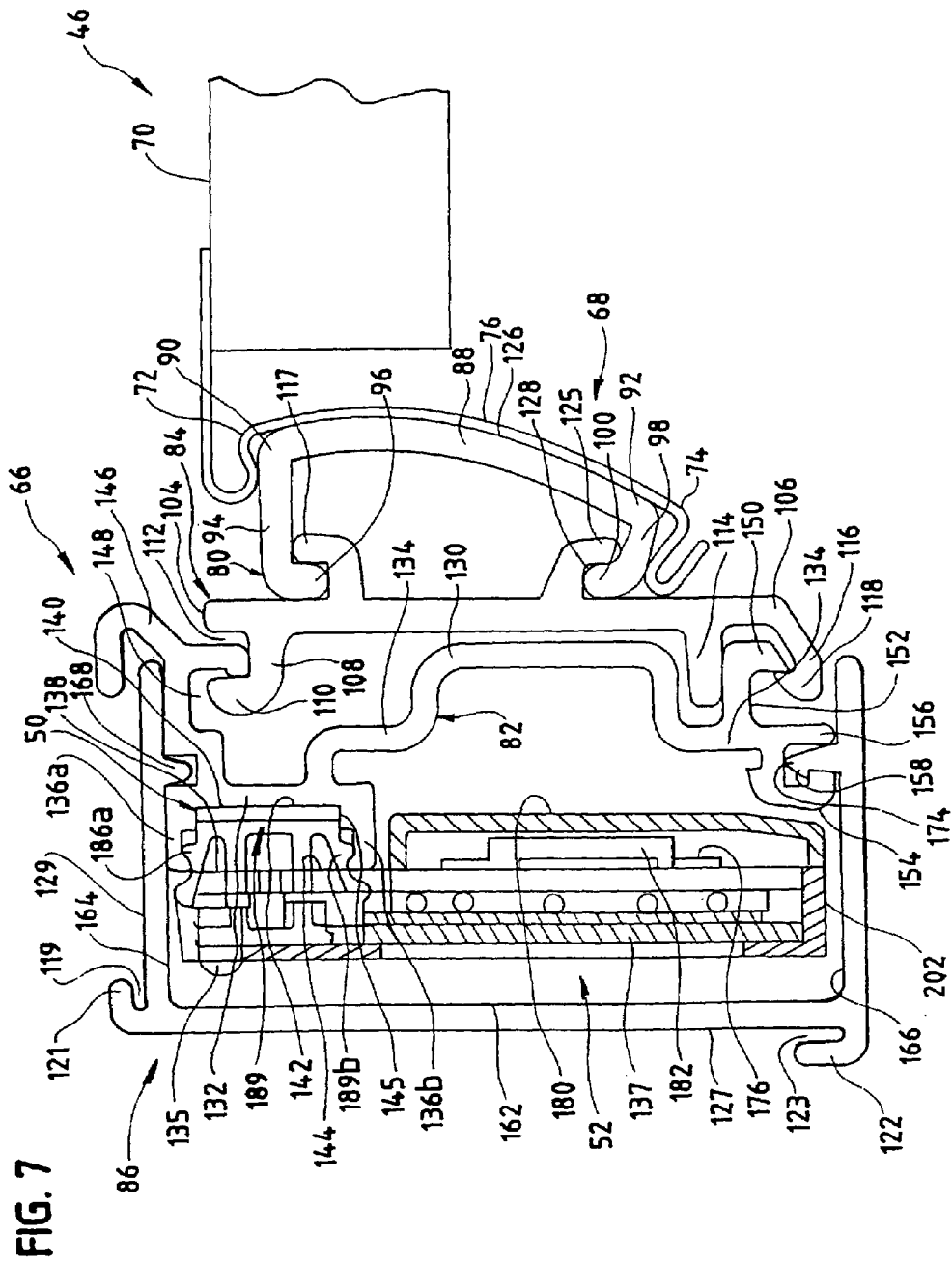
FIG. 7 is a sectional view of a module of the present invention secured to backplane via an interconnector and connector of the invention.

Referring now to FIG. 7, to establish the busses So and secure the modules 52 to the shelves 46, a modular shelf unit system 66 is employed. Typically, shelves 46 of retail stores have a tag molding 68 depending from a surface 70 of the shelf 46 where products are supported and displayed. The tag molding 68 includes a curved upper end portion 72, a curved lower end portion 74, and a web 76 formed therebetween. The web 76 is curved so as to form a channel 78. The shelf unit system 66 is designed for use with or without the tag molding 68 and includes a connector 80, a back plane 82, an interconnector 84 and a protective cover 86.

The connector 80 and interconnector 84 can either have a length equal to the tag molding 68 length of a particular section of shelf 46 or can be shorter in length as desired. If the connector 80 or interconnector 84 has a length equal to the tag molding 68 length for a particular section of shelf 46, than only one connector 80 is required for each section of shelving 46. However, if smaller connectors 80 or interconnectors 84 are utilized, a plurality of such connectors 80 and interconnectors 84 will have to be utilized for proper support of the remaining portions of the shelf unit system 66. It should be noted however that any number of connectors 80 or interconnectors 84 having various lengths can be used.

The connector 80 includes a body portion 88 having first and second angled ends 90 and 92 respectively. Extending from the first end 90 is a resilient leg 94 which terminates in an angled tip 96. The angled tip 96 angles inward toward body portion 88. Resilient leg 94 in conjunction with first angled end 90, secures the connector 80 in the upper end portion 72 of the tag molding 68. Extending from the second angled end 92 is a resilient leg 98 which terminates in an angled tip 100. The angled tip 100 angles inward toward body portion 88. Resilient leg 98 in conjunction with second angle end 92 secures the connector 80 in the lower end portion 74 of the tag molding 68. To secure the connector 80 in the tag molding 68, the connector 80 is positioned with resilient legs 94 and 98 facing away from the tag molding 68 and moved toward the tag molding 68 until upper end portion 72 contacts the first angled end 90 and the lower end portion 74 contacts the second angled end 92. Further forward movement of the connector 80 deforms the resilient legs 94 and 98 inwardly, toward the body portion 88, enabling the connector 80 to move into the tag molding 68. When each of the resilient legs 94 and 98 have cleared their respective end portions 72 and 74, the legs 94 and 98 return to their non-deformed positions and thus securing the connector 80 in the tag molding 68.

The interconnector 84 has a body portion 102 having a first extended end 104 and a second angled end 106. Extending from the body portion 102 is a first forward extending resilient leg 108 with an angled tip 110 forming a groove 112 between angled tip 110 and the first extended end 104. Extending from body portion 102 is a second forward extending resilient leg 114. Extending from the second angled end 106 is a third forward extending leg 116 having a hooked tip 118. A channel 120 is formed between hooked tip 118 and second forward extending resilient leg 114. A first and second hooked arm 117 and 125 outwardly and backwardly extend from body portion 102 so as to form channels 126 and 128.

The connector 80 and interconnector 84 attach to one another by angled tip 96 fitting into channel 126 and angled tip 100 fitting into channel 128.

Continuing to refer to FIG. 7, the back planes 82 of the shelf unit system 66 are also preferably manufactured by plastic extrusion and preferably have a length that matches the length of a section of shelf 46, for example four feet. However, it should be noted that the back planes 82 could have any particular length. The back planes 82 includes an elongate wall 130 having an upper end 132 and a lower end 134. Inwardly and forwardly facing hooked fingers 136a and 136b extend from upper end 132 where bus 50 is located in channel 145. Also extending from upper end 132 is a hooked arm 146 forming a channel 148 with upper end 132. Extending from lower end 134 is a hooked arm 150 forming a channel 152. Also extending from lower end 134 is hooked arm 154 and extended arm 156 forming channel 158. Conductors 138 and 140 are secured within channel 148. The four conductors 138, 140, 142 and 144 correspond to the four lines of the bus 50. Preferably, the four conductors 138, 140, 142 and 144 are surface embedded into their respective surfaces or using another method such as, for example, adhesive bonding or by securing the conductors 138, 140, 142 and 144 to a flexible mating base (not shown) or ribbon (not shown) which can be secured by any suitable means such as adhesive.

The module 52 with LCD display 137 and circuit board 176 are connected to the backplane 82 by connector 189. The connector 189 having wings 186a and 186b frictionally clip into position with hooked fingers 136a and 136b respectively holding the module in conductive contact with the bus 50 and lines 138, 140, 142 and 144. A transparent cover 86 removably forms a shield over the shelving unit 66.

Figure 8A:
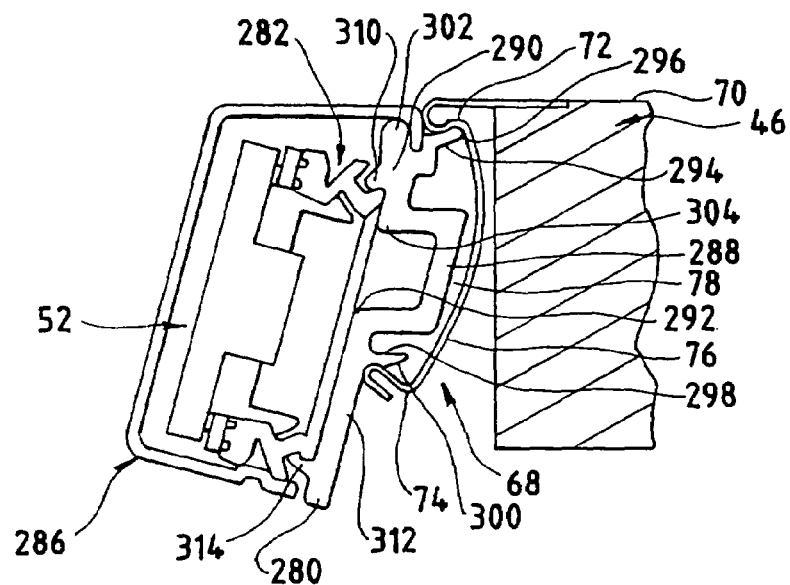
FIGS. 8a and 8b are sectional views of a shelf unit and module secured to a gondola shelf according to alternative embodiments.

As shown in FIGS. 8a and 8a the module 52 is secured to the tag molding 68 by back plane 82 via alternative embodiments enabling the module 52 to be set at various angles. These embodiments, shown in FIGS. 8a and 8b make viewing of the display 52 possible where a shelf is used that is low to the floor of the store, for example. The tag molding 68 includes a curved upper end portion 72, a curved lower end portion 74, and a web 76 therebetween. The web 76 is also curved so as to form a channel 78. The shelf unit system 66 is designed for use with the tag molding 68 and includes a connector 280, a back plane 282, and a protective cover 86.

The connector 280 can either have a length equal to the tag molding 68 length of a particular section of shelf 46 or can be shorter in length. If the connector 80 has a length equal to the tag molding 68 length for a particular section of shelf 46, than only one connector 280 is required for each section of shelving 46.

The connector 280 is comprised of a body portion 288 having first and second ends 290 and 292 respectively. Extending from the first end 290 is a resilient leg 294 which terminates in an angled tip 296. The tip 296 angles away from the body portion 288 and is designed to secure the connector 280 in the upper end portion 72 of the tag molding 68. Extending from the second end 292 of the body portion 288 is a resilient leg 298 which terminates in an angled shoulder 300. The shoulder 300 is designed to secure the connector 280 in the lower end portion 74 of the tag molding 68.

To secure the connector 280 in the tag molding 68, the connector 280 is positioned with resilient legs 294 and 298 facing the tag molding 68 and moved toward the tag molding 68 until the angled tip 296 contacts the upper end portion 72 and the angled shoulder 300 contacts the lower end portion 74. Further forward movement of the connector 280 deforms the resilient legs 294 and 298 inwardly, toward the body portion 288, enabling the connector 280 to move into the tag molding 68. When each of the resilient legs 294 and 298 have cleared their respective end portions 72 and 74, the legs 294 and 298 return to their non-deformed positions and thus securing the connector 280 in the tag molding 68.

The connector 280 also includes a resilient top leg 302 which extends from the first end 290 of the body portion 288. In a direction moving away from the body portion 288, the top leg 302 includes a wall 304 which is integral with a forwardly extending wall 306 which is integral with a wall 308. The wall 308 terminates in a hooked flange portion 310. The connector 280 further includes a resilient lower leg 312 which extends from the second end 292 of the body portion 288. Extending forwardly from the leg 312 in a direction away from the body portion 288 is a hooked flange portion 314.

Figure 8B:
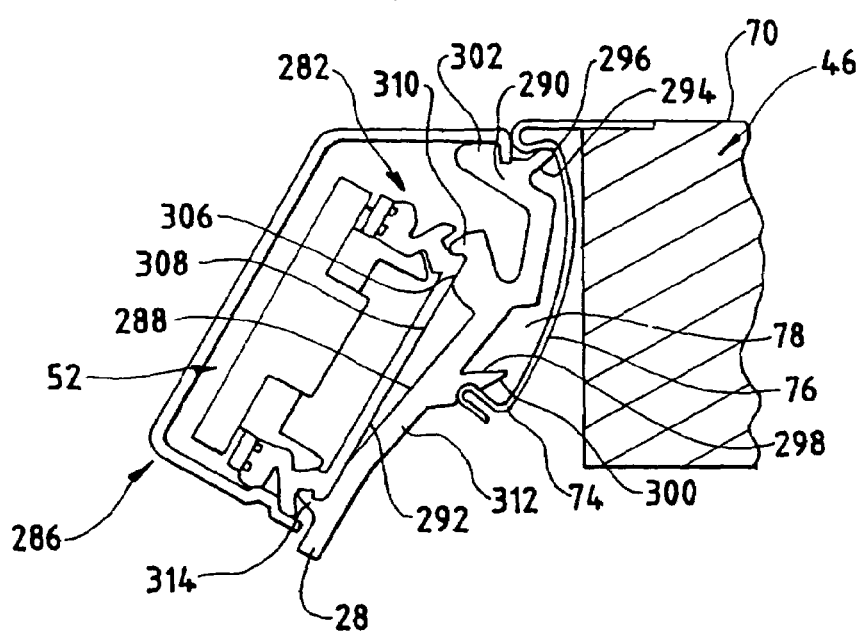

Preferably, the connector 280 is manufactured of plastic by injection molding. The dimensions of the connector 280 can be altered to custom manufacture the connector 280 to mate with any specific retail shelf design. Further, the dimensions of the connector 280 can be modified to alter the viewing angle of the shelf unit system 66 as seen in FIGS. 8a and 8b.

Also, as shown in FIG. 9 is an alternative embodiment that enables the module 52 to be set at different angles.

Referring back to FIG. 5, a plurality of back planes 82 are arranged in a daisy chain configuration using the interconnectors 84 to form a chain 147. The chain 147 begins with a first back plane 82a, terminates with an nth back plane 82b and has numerous back planes 82 and interconnectors 84 therebetween. The chain 147 should have a length equal to the length of a shelf 46 or shelf section. At the end of the first back plane 82a, closest to the gondola controller 48, connected to the gondola controller 48, is a four pin header 151. One pin is dedicated to one conductor 138, 140, 142 or 144 respectively (see FIG. 4) on that back plane 82a so as to enable communication between the gondola controller 48 and the four conductors 138, 140, 142 and 144 on the first back plane 82a. The gondola controller 48 supplies the power to each bus 50. At the end of the back plane 82b is protective end cap 155.

The back planes 82 of the chain 147 are secured together in the daisy chain configuration using the interconnectors 84. The interconnects 84 are of custom design to snap onto adjacent back planes 82 and provide for ease of installation of the shelf unit system 66. The interconnectors 84 also link conductors 138, 140, 142 and 144 (FIG. 4) on adjacent back planes 82 so as to form the four line bus 50 that runs the entire length of the chain 147. The bus 50 provides for the propagation of power and data signals along the length of all back planes 82 of the chain 147.

According to FIG. 10a, the interconnector 84 utilizes bus interconnector 161 which has electrical contacts 173 thereon which mate conductors 138, 140, 142, and 144 via the bus 50. The bus interconnector 161 interfits, via ears 181, 183, in the back-plane 82, and with flexible mating ribbon connector cable 160 electrically enables the daisy chain of the back planes 82.

The bus interconnectors 161 provide a novel method of interfitting cable therein via aperture an 179 whereby contact tines 171 are mated with cable 160 via a cap 185 having fingers 187 formed therewith.

The daisy chain configuration of the back planes 82 is advantageous in that the daisy chain configuration provides the flexibility to add additional back planes 82 for varying shelf lengths with minimal installation effort. Furthermore, the daisy chain configuration enables a bus system approach to wiring that runs in parallel on each length of shelf 46 rather than having wiring that runs transverse to and behind shelves. The daisy chain configuration also enables faster and more efficient data transmission times to and from individual modules 52 due to the parallel architecture of the busses so.

For both shelves 46 (FIG. 2) and shelf sections with height or depth discontinuities, a flexible mating ribbon connector 160 can be provided to link conductors 138, 140, 142 and 144 (not shown) on adjacent back planes 82 as shown in FIG. 10.

Referring back to FIG. 7, the shelf unit system 66 includes a cover 86 that is preferably manufactured of extruded clear plastic. The cover 86 has, a length that usually runs the length of a back plane 82. The cover 86 is U-shaped having a central wall 62, and first and second walls 164 and 166 that extend transversely from the central wall 162. The first wall 164 terminates in a downwardly extending flange 168. The flange 168 is designed to interfit the hooked arm 146 of the backplane 82. In practice, the cover 86 is slid into the backplane 82. The cover 86 positioning is advantageous in that tampering by unauthorized individuals is minimized. The wall 166 of the cover 86 includes a generally V-shaped portion 174 that is designed to be positioned in the outer channel 158 of the extended arm 156 of the backplane 82.

The cover 86 also includes a first formed lip 122 which provides a first groove 123, formed in conjunction with a first cover face 127, in which a variety of desired labels (not shown) or advertising media (not shown) can be displayed. In the alternative, or as a desired addition, the present invention provides a second groove 119, formed by a second formed lip 121, formed in conjunction with a second cover face 129, in cover 86 which can perform the same service.

Continuing to refer to FIG. 7, to display the real-time information on a shelf, numerous modules 52 are used. Each module 52 includes a circuit board 176, a visual display 137 and a housing 180. The circuit board 176 has on its lower surface electrical contacts (not shown) that are designed to contact the conductors 138, 140, 142 and 144 of a back plane 82 to supply power and data to the module 52. Preferably, the dimensions of the circuit board 176 are 1.75"×1.85". Referring to FIG. 6, the circuit board 176 has thereon a microcontroller 182 such as a conventional 4 bit microprocessor (not shown). In real world operation, the microcontroller 182 spends a large percentage of its time in standby mode which results in significantly reduced ampere requirements on an associated power supply. The microcontroller 182 has a built-in unique electronic identification number or address (MODID) that is utilized as that module's communications address. A differential receiver 184 is located on the circuit board 176 and links communication between the data conductors 138 and 140 of the back plane 82 and the microcontroller 182. The differential receiver 184 converts the differential data signals on the two conductors 138 and 140 into standard CMOS signals for electrical compatibility with the microcontroller 182 and visual display 137.

Referring back to FIG. 7, the visual display 137 such as a liquid crystal display (LCD) is positioned above the circuit board 176 and is in electrical communication with the microcontroller 182. The present invention could also be carried out by eliminating the circuit board 176 and mounting microcontroller 182, and differential receiver 184, directly onto the back (not shown) of visual display 137. Alternatively, other visual displays capable of real-time visualization of product information such as LED's 135 and FEDs (not shown) could also be utilized. The visual display 137 is as large as possible so as to maximize the consumer's viewing area. The present invention also has the ability to utilize modules 52 having video display ability via video receiver/driver 137a (FIG. 6). Partial motion-video would be thus attained. The preferred embodiment for video modules 52 would be to utilize LCD displays, but other video displays could be used, utilizing appropriate video drivers as needed.

Additionally, full motion video could be displayed via an external display 48d (FIG. 5), which could be disposed elsewhere in a gondola 44 (FIG. 2) location, and be driven by video driver 137a.

Digitized video can be treated as any other file type by the system 30. The communications path 48g of WAN 43 to in-store processor 32 to gondola controller 48 is used. This path 48g supports up to 10 megabits per second of communications bandwidth. There are two options for the final connection of the Shelf Video Display (SVD) 48d. For still video, or short video clips which do not change very often, the video files (not shown) are loaded in non-real time to the video random access memory (not shown) in the SVD 48d over the existing shelf edge structure 46. This allows the SVD 48d to be placed at any appropriate location on the shelf 46.

For more real time video applications, the SVD 48d is connected directly to the in-store Ethernet 48c. This takes advantage of the larger bandwidth. Using conventional video compression techniques, a large number (at least 50) of SVD's 48d can be serviced by the in-store Ethernet 48c without impacting normal communications.

The preferred visual display layout is shown in FIG. 11. The visual display 137 includes nine seven-segment digits, one two-segment digit, two decimal points, one dollar sign, two cent signs, a FOR icon, a PER icon, two alphanumeric characters and an enumerator. The seven-segment display 186 in the upper left hand corner of the display represents the number of units for sale at a posted price, i.e. 3 FOR $1.79. This digit and the FOR icon 188 are blanked for products which are not on sale for multiple units per price.

The four seven-segment displays 190 with the decimal point 192 in the upper row of the visual display 137 layout represent the product price. The visual display 137 layout will support prices, up to $999.99. For prices of $9.99 or less, the leftmost digit is blanked for aesthetic purposes, likewise for the second leftmost digit for prices less than $1.00 which can be displayed in dollar or cent format.

The four seven-segment displays 194 with the decimal point 196 in the lower row of the visual display 137 represent the product unit price, i.e. $1.19 (per pint). The seven-segment displays 194 and decimal point 196 will support product unit prices up to $199.99. For prices of $9.99 of less, the leftmost digit is blanked for aesthetic purposes, likewise the second leftmost digit for prices less than $1.00 which can be displayed in dollar or cent format. The unit pricing display is slightly smaller in size than the item pricing display in order to accent the actual product price. A two-digit sequence to the left of the seven-segment display allows unit prices up to $199.99.

Unit of measurement information is displayed on the visual display 137 by the PER icon 198 and the two alphanumeric characters 200. The alphanumeric characters 200 can display any two number/letter sequence, for example $3.43 PER LB.

It should be noted that the above detailed visual display 137 layout can be altered in numerous ways to display various types and combinations of product information. The above example is not intended to be limiting with respect to the layout of the visual display 137. For example, visual display 137 can be made the same length as the shelf edge 46 (FIG. 2). Also, the layout of the visual display can be configured to cooperate with an overlay. The overlay would have information printed on it such as "PER", "$", "UNIT PRICE" etc and thus serve as a legend for the numerical information that is being displayed on the visual display 137. The overlay would then be secured to the visual display 137 by suitable means. Further, the module may include a display such as the word "SALE", "SAVE", "CLUB", "PREF", for example, cooperates with one or more LED's 135 that light a portion of the housing of the module 52 and serves to highlight the word sale to attract consumer attention to a product that may be on sale at a given period of time. The gondola controller 48 (FIG. 3) would send a signal to the module 52 to light the LED's 135 when the product that correlates with that module 52 is on sale. At the end of the sale period, the gondola controller 48 would send a signal to the module 52 to turn off the LED's 135. It should be noted that the present invention has the ability to run information controller 42, gondola controller 48, and the modules 52 to put into practice special sales events where any or all item prices are changed or lowered a predetermined time for a specified period. The LED's 135 could cooperate by flashing in a predetermined fashion.

The use of the LED's 135 with the bus is accomplished by strobing the LED's 135 in a time multiplexed manner, thus arranging them in a geographically dispersed multiplexed LED configuration. Without the geographically dispersed multiplexed LED's 135 the use of LED's 135 would require too much power and jeopardize the integrity of the product information in addition to raising the cost of the entire product information system. The present invention resolves these problems by also dynamically reading information on the bus 50 to manage power to the LED's 135.

As best shown in FIGS. 7 and 11, the housing 180 surrounds the circuit board 176 and visual display 137 to protect the module 52 and to enable the module 52 to be removably securable to any location along any back plane 82. The housing 180 includes a bottom wall 202 upon which the circuit board 176 is supported. The housing 180 surrounds the circuit board 176 and the visual display 137 so as to only minimally cover the top surface of the visual display 137 while allowing the majority of the top surface to be seen by the consumer. The module housing 180 also contains temperature sensor 191 which relays telemetry information to microcontroller 182 forwarding to an associated gondola controller 48. The overall size of the module 52 can be varied and customized.

Referring to FIG. 7, to secure a module 52 to any position along a back plane 82, the wings 186a and 186b of connector 189 are aligned with the respective hooked fingers 136a and 136b of the back plane 82. Forward movement of the module 52 in this position deforms both of the wings 186a and 186b of the connector 189. Further forward movement secures the module 52 in position such that the wings 186a and 186b are positioned locking hooked fingers 136a and 136b of the backplane 82. To remove the module 52 from the backplane 82, the wings 186a and 186b are gripped and the module 52 is moved away from backplane 82, freeing the wings 186a and 186b of the connector 189 from the hooked fingers 136a and 136b of the backplane 82. To remove the module 52 from the back plane 82, the housing 180 is gripped and the module 52 is moved forwardly with enough force to free the legs 204 of the module 52 from the inner channels 126 of the back plane 82. With the above arrangement, the modules are easily snapped into and removed from back planes 82.

The modules 52 are positionally independent on a back plane 82 in that any module 52 can be placed anywhere along a back plane 82 and any number of modules 52 can be plugged into a back plane 82 limited only by physical space. Should another product be added to a shelf 46 or the shelf 46 replanned, affected modules 52 need only be removed from their current positions and placed in the new location. If the distance between the old and new location is small, the module 52 can be slid from location to location.

Depending upon the height of the shelves 46 of the gondolas 44 (FIG. 2), the viewing angle of the modules 52 can be altered to better present the modules 52 for viewing by the consumer. To alter the viewing angle, the dimension of the connector 80 are modified as shown in FIGS. 8a and 8a. Specifically, to alter the viewing angle for modules 52 that are to be attached to shelves 46 below eye level, the body portion 88 of the connector 80 is shortened while the lower leg 312 is lengthened. These modifications enable the modules 52 to make a greater angle with respect to a vertical axis thus enhancing viewing of the modules 52 by the consumer.

Figure 7A:
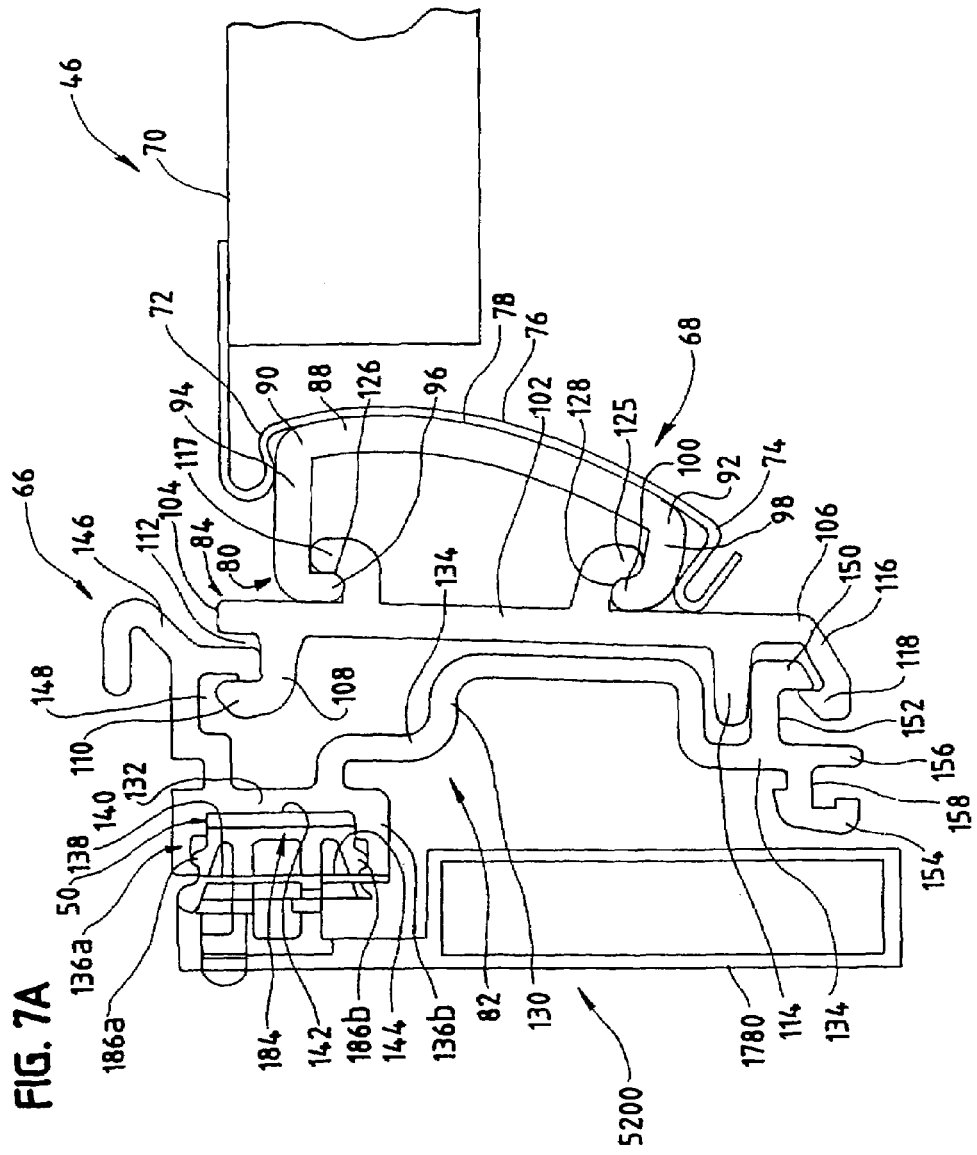
FIG. 7a is a sectional view of an associated display and corresponding apparatus.

The present invention (FIG. 7a) also can utilize a number of different associated display apparatus, such as associated display module 5200, having an associated display 1780, which can be, for example, a video display. The associated display module 5200 interfits back plane 82 in the same way as the standard module 52, utilizing attachment wings 1186a and 1186b.

Each module 52 is in communication with the conductors 138, 140, 142 and 144 on a back plane 82 and therefore in communication with a respective bus 50 and gondola controller 48. The communication is two-way thus providing positive assurance that messages and data are received by an intended module 52. In simplest terms, the gondola controllers 48 manage communications on the data lines 138 and 140 of the bus 50 and send messages to the modules 52. The modules 52 send back responses to messages particularly addressed to them. Communications between the modules 52 and the gondola controller 48 is synchronous or asynchronous at a variety of baud rates, for example, 2400 baud.

Referring to FIG. 1, a communications protocol (not shown) for the product information system 30 establishes the formats, methods and times of communication between the gondola controllers 48 and the modules 52. The product information system 30 can be further networked to a Wide Area Network (WAN) 43 such as the Internet and/or to advanced networking architecture such as the ISDN (not shown) through Wide Area Network controller (WANC) 41. The WANC 41 includes standard communications interfaces. When in-store processor 32 has the ability to interface with a WAN such as the Internet, all network communications would be through the resident interface. Alternatively, one or all gondola controllers 48 could have a WANC 41 for interface into an external network.

The prime communications protocol of the system 30 is the internet compliant TCP/IP protocol (not shown). The in-store processor 32 is connected to the various gondola controllers 48 using standard Ethernet connections (the Store Ethernet 48c). For Internet connectivity, an Ethernet Router 41a is installed on the Store Ethernet 48c, and a telecommunications connection such as ISDN or T1 is made to a local Internet Service Provider. The in-store processor 32 can use the UNIX operating system to provide many internet functions such as Telnet, File Transfer Protocol (FTP), and Electronic Mail directly. Conventional emulation software can be loaded in the Gondola Controllers 48 to provide emulation of the desired Internet functions.

These connections allow remote uploading and downloading of system files such as price files and space planning over the internet from or to any Internet connection device. In addition, since each Gondola Controller 48 knows the "health" of its attached module 52, centralized (via the Internet) real-time fault isolation of the modules 52 can be performed remotely. Conventional firewall software in the in-store processor 32 provides security for these functions so that only appropriate parties have access to the information.

The more elaborate and graphically oriented Worldwide Web (WWW) subset of the Internet is also supported by the system 30 of the present invention. This subset provides more user oriented services such as sale notification, ordered shopping list generation, and least cost shopping services to Web connected consumers. One of ordinary skill can readily appreciate the value added services such an network site would provide users of the present invention.

Detailed communications methodology between the gondola controllers 48 and modules 52 of the present invention will now be discussed followed by a discussion of communication between the information controller 42 and the gondola controllers 48. (FIG. 1,6).

The total length of a data packet is typically 128 bits. A serial transmission rate of 2400 baud requires approximately 45 milliseconds for the data packet to be transmitted from the gondola controller 48 to a module 52. The transmission of a data packet (not shown) includes a start bit, eight data bits, and a stop bit. All data is sent in bitmapped format.

It should be noted that each module 52 can be addressed individually or a universal broadcast message (UBM) can be issued by a gondola controller 48 to communicate with all of its assigned modules 52 simultaneously. An address of 0 (hex) will indicate a UBM and be received and processed by all of the modules 52 assigned to that gondola controller 48.

Referring now to FIG. 6, When a module 52 is plugged into a back plane 82 and receives power from the bus 50 of that shelf 46, the microcontroller 182 starts from a power-on reset point and cycles through a three-step process which includes a testing state, an empty state and an active state.

Immediately after receiving power, the module 52 enters the testing state and tests itself to verify ROM and RAM memory operation and basic processor operations if desired. If the self-test fails, then the module 52 attempts to display an error pattern on the visual display 137 to show that power is present but a failure has occurred. In this state the module 52 does not attempt to listen to the messages on the bus 50 or attempt to send a message on the bus 50. The module 52 remains in this testing state until reset.

If the module 52 passes the self-test, the module 52 flashes a self test pass pattern (not shown) on the visual display 137 which activates all, display segments to permit visual confirmation that all segments of the visual display 137 are working. The self test pass pattern is held for a period of time, such as a half-second, to make sure that the pattern can be observed before any product information appears on the visual display 137, a self test pattern is then displayed. Thereafter, the module 52 begins to listen to the bus 50 for incoming messages assigned to it or any UBM messages. If no messages on the bus 50 are received, the module 52 flashes the self test pass pattern and continues to listen to the bus 50. In this state, the module 52 is working properly but has received no data to display.

If the module 52 hears a complete message on the bus 50, even if that message is addressed to some other module 52, the module 52 advances to its next state, the empty state. In the empty state, the visual display 137 changes to displaying "--.--", or "OK" to indicate that testing is complete but no product information has been provided. In the empty state, the module 52 sends out an MODID message on the bus 50 when requested by the gondola controller. The MODID messages reports the module's unique address and requests product information to display. The module 52 will continue to send the MODID message, at the times permitted by the communications protocol, as explained more fully below, until the module 52 receives valid product information in the form of a data packet addressed to that specific module 52.

The two data lines 138 and 140 of each bus 50 are a party line with the communications protocol controlling which devices can talk at any given time. The gondola controllers 48 take priority when sending out data packets to modules 52 so the communications protocol is based on a "speak only when spoken to" rule for the modules 52. The gondola controllers 48 can send an addressed data packet message to a particular module 52 which then gives that module 52 permission to respond. To allow newly plugged in modules 52 to request product information, the gondola controllers 48 regularly send out unaddressed UBM messages that give all modules 52 in the empty state permission to respond with MODID messages.

During normal operations (FIG. 3), the gondola controllers 48 poll their respective modules 52 by sending out HRUN ("How are you number N?") messages to each module 52 that the gondola controller 48 believes should be on a specific bus 50. The addressed module 52 responds with an OK message if the module 52 is present and is displaying product information. Alternatively, the modules 52 responds by transmitting a copy of the product information that is currently being displayed to the respective gondola controller for verification by the gondola controller. The gondola controller 48 continuously cycles through all modules 52 assigned to it and reports to the information controller 42 any modules 52 that have failed, vanished or are displaying incorrect information.

During routine polling by the gondola controllers 48, the gondola controllers 48 are able to respond quickly if a new module 52 is plugged into a back plane 82 assigned to it by interspersing its polling with WRU ("Who are you?") messages. The WRU message is a UBM not addressed to any particular module 52. The WRU message is an invitation for any and all empty state modules 52 to speak up. All modules 52 that are in the empty state respond to the WRU message by sending the MODID message containing the module MODID. If only one module 52 responds to a gondola controller's WRU message, then there will be no interference on the bus 50 and the gondola controller 48 will receive the MODID message from the module 52 and send a data packet to that module 52. The above procedure immediately restores the product information to be displayed on any module 52 that was unplugged and replugged on the bus 50.

In response to the WRU message, if more than one module 52 responds with the MODID message, which happens after a wire fault or power failure, then the MODID messages will interfere with each other on the bus 50 and the gondola controller 48 cannot understand the individual module MODID messages. The gondola controller 48 detects the cacophony of responses to its WRU message and in response, sends out data packets to each of the modules 52 assigned to it as a mass refresh. Alternatively, the gondola controllers 48 are programmed to deal with message collisions when more than one module 52 responds to the WRU message to better ascertain which modules 52 need be provided with data packets instead of providing data packets to all modules 52 whether they are requesting information or not.

A mass refresh by the gondola controller 48 should satisfy all empty state modules 52 making the bus 50 quiet in response to further WRU messages. However, it is possible that stray modules 52 that have either not been registered to a particular product or that have failed in some way could be plugged into a back plane 82 and be in communication with a bus 50. Such stray modules 52 continue to respond to WRU messages by the gondola controller 48 thus interfering with other communications on particular bus 50. The gondola controller 48 can send a SUP (Shutup) message to the stray modules 52 to keep the bus 50 clear for other operations.

If a module 52 receives a SUP message, the module 52 ceases responding to messages on the bus 50 and enters an inactive state. In the inactive state, the module 52 displays a message such as "OFF" and ignores further general communications on the bus 50, except specialized messages addressed to that specific module. The gondola controller 48 sends a message to the information controller 42 to report the stray modules 52.

To assure that message have been correctly received by the modules 52, the communications protocol uses, for example an error detection mechanism such as CRC16 code (not shown), or a checksum algorithm (not shown) for each message sent. CRC16 is an industry standard error detection mechanism with a high degree of reliability. Checksums are an algorithmic function of the data transmitted in the message. When a module 52 receives a data packet addressed to it, the module 52 computes and stores a checksum for the data. The checksum computed by the module 52 should match the checksum provided in the data packet from the gondola controller. If the checksums match, the module 52 responds to the gondola controller 48 with a PACK (price acknowledge) message and thereafter transitions into the active state. Upon receiving timeout message, the gondola controller 48 retransmits the data packet to the module 52. If a no response continues to be received by the gondola controller 48, the gondola controller 48 communicates with the information controller 42 to report a failed module 52.

To summarize, during normal polling by the gondola 20, controller 48, a module 52 in the active state responds to the HRUN message addressed to it by sending back an OK message. In response to a validly received data packet addressed to it, the module 52 sends a PACK message to the gondola controller 48 and thereafter displays the newly received product information on the visual display 137.

Nothing else happens with the modules 52 unless power to the modules 52 is interrupted. When power is restored, the modules 52 will have lost their product information and will begin their power-on sequence again by entering the testing state. The present invention also provides an ambient temperature sensor 191 (FIG. 6) which operates in conjunction with microcontroller 182 to provide telemetry information on the bus 50 to the gondola controller 48. Thus, temperature information could be displayed on visual display 137 if desired, and/or transmitted to the information controller 42 for any desired action, such as an alarm, etc.

Referring now specifically to the gondola controllers 48, the gondola controllers 48 interface with the information controller 42 as well as with the busses 50 and modules 52. Each gondola controller 48 has four (sometimes five) main responsibilities: (1) monitoring the health of itself and its assigned busses 50 and reporting any problems to the information controller 42; (2) maintaining product information for each of its assigned modules 52 where the product information is provided by the information controller 42 and is used to load or reload product information to the modules 52 when required; (3) continuously monitoring the status of every assigned module 52, sending product information when needed and reporting to the information controller 42 if any module 52 fails or is defective; (4) during module registration operation, reporting the MODIDs of newly plugged in modules 52 to the information controller 42; and sometimes (5) managing interface to external communications network.

The communications protocol between the >information controller 42 and the gondola controllers 48 is set up such that two way communication exists between the information controller 42 and the gondola controllers 48, and all communications via conventional ethernet processes, take place in standard TCP/IP protocol format (not shown)

The general operation of the gondola controllers 48 is as follows. When each gondola controller 48 is initially powered up, its built-in ROM software performs a basic power-up self-test and then periodically sends an GCSTATUS command to the information controller 42. The GCSTATUS command reports the gondola controller's GCID and requests a software download. When the downloaded programs are received, the gondola controller 48 conducts a more thorough self-test including extensive pattern tests of its RAM. If a hardware failure is found, the gondola controller 48 enters a failed state and attempts to report its status to the information controller 42 while ignoring all subsequent commands and leaving the modules 52 alone.

If the self-tests are satisfactory, the gondola controller 48 then moves into an empty state and waits for a command from the information controller 42 while also periodically sending a GCSTATUS message to the information controller 42 reporting the gondola controller's GCID and status and requesting product information to form a information table for its assigned modules 52. No gondola controller-module communication occurs at this time. Depending upon the command received from the information controller 42, the gondola controller 48 will next transition into either an active or a loading state.

After system power-up or whenever product information is changed, the information controller 42 broadcasts a STARTTABLE message to all of the gondola controllers 48. The STARTTABLE command from the information controller 42 is used to transition the gondola controllers 48 from their empty state into a loading state. When the STARTTABLE command is received by a gondola controller 48, a copy of any previously existing information table is made. Next, all of the modules 52 under the control of the gondola controller 52 are reset to the empty state to avoid the possibility that one or more modules 52, which are no longer to be included in the soon-to-be transmitted information table, will continue to display old information.

If the information controller 42 sends an SENSEIDON message to a gondola controller 48, the gondola controller 48 enters the active state where it listens for MODID messages from the modules 52. This allows registration of the modules 52 to occur even if the gondola controller 48 does not have an information table.

While in the loading state, the gondola controllers 48 accept and store all product information corresponding to their respective addresses. After the STARTTABLE command, a P command is used to download an information table to the gondola controller 48. The download of a complete information table is expected by the gondola controller 48 if the ENDTABLE command has not been issued since the last STARTTABLE command. New product information records are then accepted and the information table is formed and stored in the gondola controller's RAM.

The ENDTABLE command is used to end an information table download sequence. The ENDTABLE command also supplies a table identifier (table id) and checksum. The information controller 42 expects to see an updated price table id field from the gondola controller 48. If the table id field is not updated, a mismatch will result in an information table download retry.

Corruption of the information table is detected by a mismatch of a checksum value supplied by the information controller 42 when the ENDTABLE command is received and a checksum calculated by the gondola controller 48 from the information table data. Corruption of the information table is also detected if the ENDTABLE command is not received within a predetermined time interval. If corruption of the information table is detected, the gondola controller 48 discards the product information received since the last STARTTABLE command. If a previously loaded information table was saved, it will be used by the gondola controller 48. If a previously loaded information table does not exist, the gondola controller 48 remains in the empty state.

If a successful validation of the information table occurs, the information table will be activated by the gondola controller 48 and each table entry is transmitted to its respective module 52 in long block data format. If the P command occurs without the STARTTABLE command occurring first, instead of downloading a complete information table, the command is treated as an item add or change function. If a product's corresponding module is not registered in the information table, it will be added. If the MODID already exists in the information table, it will be updated with the supplied product information.

The DELETE command is used to delete an information table entry according to a MODID. The information table checksum is adjusted after every change to the information table.

Once the information table has been fully received and verified by checksum, the gondola controller 48 enters the active state. In the active state, the gondola controller 48 conducts-several concurrent processes including: polling the modules 52 for status, sending product information to modules 52, interfacing with the information controller 42 by issuing and receiving various commands, and performing self-checks.

During polling, the gondola controllers 48 steps continuously through the information table polling all of the respective modules 52 in turn. Modules 52 that need product information are sent a data packet. Modules 52 that are thought to be operating satisfactorily are polled to verify that all is well. A count/state byte for each module 52 keeps track of what the gondola controller 48 knows about each module 52.

When a new information table is sent to the gondola controller 48, such as when product information is changed, the gondola controller 48 zeroes the count/state byte for all assigned modules 52 indicating that no data packets have been sent to the modules 52. As a part of polling, the gondola controllers 48 transmit data packets to the modules 52 until they acknowledge with the PACK message. The count/state byte is used to count how many times a data packet has been sent to a module 52 without acknowledgment by that module 52. If the module 52 acknowledges the data packet with the PACK message, the count/state byte is set to a coded value that means the module 52 is operating normally. If the module 52 does not acknowledge the data packet after a number of attempts, for example three, the count/state byte tops out and the gondola controller 48 reports the module 52 as failed to the information controller 42.

Another command that is received by the gondola controller 48 from the information controller 42 during the gondola controller's active state is STSQRY. The STSQRY command is used to request a status packet from a gondola controller 48. The gondola controller 48 responds with a GCSTATUS command.

The GCSTATUS command may be initiated by the information controller 42 or a gondola controller 48. The purpose of the GCSTATUS command is to provide the information controller 42 with operations information, report the status of the gondola controller itself, and report the status of the busses 50 and modules 52. The gondola controller 48 periodically performs a self-check after every polling cycle through the information table. The self-check process verifies processor and RAM operation checking that the information table is intact and the checksums check. A periodic GCSTATUS message is sent by the gondola controller 48 to the information controller 42 if the gondola controller self-check is normal.

If a gondola controller 48 detects a problem with its information table checksum but its self-checks are satisfactory, the gondola controller 48 transitions to the empty state to request a new information table from the information controller 42.

When any error condition is detected, the GCSTATUS message will be received by the information controller 42 and recorded in a log. A log entry will also be made for corrected error conditions. Any FAIL message implies that the gondola controller 48 should be serviced or replaced. If the gondola controller 48 reports FAIL as the first part of the status message, the gondola controller 48 does not attempt to determine the bus 50/module 52 status so that the gondola controller 48 can utilize the second part of the status message to report any supplemental information that may be available.

In order for the product information system 30 to operate, modules 52 must be correlated with the product whose information the modules 52 is assigned to display. Registration is the process of associating a particular module 52 with a particular product so that the module 52 will display that product's information. Therefore, each module 52 must be registered when it is installed. As the modules 52 are being registered, the information controller 42 creates a database (not shown) organized around UPC codes, each of which is associated with a particular product. For each UPC code, the database contains the product information, the GCID, the bus number, and MODID. Thus, product information can be broadcast to all gondola controllers 48 but saved only by a particular gondola controller 48.

Modules 52 (FIG. 1, 3) can be registered to a particular product in two ways; mass registration or scanning registration. Mass registration operates by registering modules 52 using a specially prepared space map file. This type of registration is primarily intended for store initialization and major shelf rearrangements. Scanning registration is generally intended to be used when modules 52 need to be added or replaced. Both types of registration utilize the handheld UPC code scanner terminal (HHT) 54 linked to the in-store processor 34 and information controller 42. The HHT 54 includes a UPC scanner 54*a*, keyboard 54*b*, and a multi-line display 54*c* so that the information controller 42 displays messages to the operator of the HHT 54.

The commands between the information controller 42 and the gondola controllers 48 with respect to registration are as follows.

SENSEIDON. The SENSEIDON command is used during registration to put the gondola controller 48 into a state where it is looking for newly plugged in modules 52.

SENSEIDOFF. The SENSEIDOFF command is used to take the gondola controller 48 out of the SENSEIDON state.

DELETE. The DELETE command is used to delete an information table entry according to a module address. The product information checksum is thereafter adjusted to account for the deletion.

NEWMOD. The NEWMOD command is used to upload a module address (MODID) from the gondola controller 48 to the information controller 42.

ITEMSHOW. The ITEMSHOW command is used to send sequence numbers from the gondola sequence file to the respective gondola controller 48.

Now referring to FIG. 1, the present invention is also capable of utilizing a handheld wireless RF terminal (HHT) to communicate with the In-Store Processor 32 from any location in a store using a HHT 54. The HHT 54 gives the user the capability to register module 52 and to manage the system from terminals through out the store. The System process includes tasks that run constantly when the system 30 is up to monitor the status of the System and update the System automatically.

The HHT process has many functions that a user can perform. To initiate the HHT process the user must log on to the HHT 54 and select SYSTEM from the menu (not shown). The system on the handheld is typically divided into three functions such as, Shelf Management, Shelf Audit, and System Admin.

Shelf Management gives the user the capability to manage the shelf 46 at the shelf edge (not shown). There are major functions, Product Reset, Label Management, and module 52 Verify. Product Reset is to be used when the user is adding, deleting, or re-arranging items on the shelf 46. There are four functions under Product Reset, Store Setup, Category Reset, Shelf Reset, and Label Define.

Store Setup is used when a store is initially installed. The user will set up the products on the shelf 46 and install the labels. When Store Setup is selected the user will be prompted to scan the label barcode. After the barcode is scanned the process will find the records for that label in the corresponding database (not shown). This table will contain the records for all the label's that are to be posted. The process will then display on the HHT 54 the label barcode number, the UPC for the first item on the shelf of interest, which will typically be the left most item, the Aisle, Side, Bay, and Shelf location for that item, the description for the item and a message for the user to PLUG IN module 52.

At this time the user will plug in a module 52 for that item on top of the printed module 52 target. When the module 52 is plugged in the gondola controller 48 will detect the existence of the new module 52 and ask the module 52 for its ID number. The module 52 will send the ID number to the gondola controller 48 which in turn will forward the information to the Store Setup database (not shown). The process will receive the NEW MODULE message from the gondola controller 48 and add a record to the Space Map table for that item with the appropriate information. It will then delete the record for that item from the label Pending table (not shown). A sequence number will then be sent to the gondola controller 48 to forward for display to the module 52. The sequence number is a 1 up number beginning at 1 for each item on the shelf with the left most item being number 1. When the sequence number appears on the module 52, it is registered to that item at that location. The next item on that shelf will be displayed on the handheld 54 for the user to register. This process will continue until the user has registered all the items for that shelf. At this time the user will be prompted to scan another label barcode. When there are no more to be scanned the user must press the END key on the handheld 54. When the END key is pressed, the price information for each of the module(s) 52 that were registered will be sent to the gondola controller 48 to be stored in the gondola controller 48 Price Table which will store the price information and forward it to the module(s) 52. The price will then be displayed on the module(s) 52.

Category Reset is used when there are major physical changes to an aisle or bay. The only difference between Category Reset and Store Setup is that the user will be prompted to DELETE label. The user will scan the label barcode for the old label that is presently on the shelf 46. When this is done the record will be deleted from the Space Map table (not shown) and added to the label Deleted Table (not shown). The user will then be prompted to SCAN label for the new label that is being posted. The rest of the process is identical to that of Store Setup.

Shelf Reset is to be used when a shelf or shelves 46 have been rearranged. The user will be prompted to SCAN OLD label. The user will scan the label barcode for the label that is being removed. The records for that label will be deleted from the Space Map Table (not shown) and added to the label Deleted Table (not shown). The user will then be prompted to SCAN NEW label. The user will scan the label barcode for the new label that is being posted. The rest of the process is identical to Store Setup except that the sequence number will not be displayed. The price information will be displayed.

Label Define is used to set a shelf with products and install module(s) 52 but there is no label to post. The user will arrange products on the shelf 46. For the left most item on the shelf, the user will be prompted to SCAN UPC. The user will scan the UPC for that item, the UPC number, and the description of that item will appear on the handheld 54 along with a prompt for the user to enter the aisle designator. After the user enters the aisle (not shown), they will be prompted to enter the aisle side, the bay, shelf, item number, and the total number facings for that item. After the information is entered the user will be prompted to PLUG IN module 52. The user will plug in the module 52 and the price information will appear on the module 52. The user will continue this process until all items for that shelf are registered. A record of each item registered will be written to a file called Label FILE. This file can be retrieved by the enterprise so label's can be printed.

Label Management is another function under Shelf Management. There are two options under label Management, label Replace and label Print Request. Label Replace is to be used when the only thing changing on the shelf is the label. This will normally occur when there is advertising that is to be posted or removed from the label. The user will be prompted to scan the old label that is being removed. They will scan the label barcode for the new label that is being posted. If there are no problems the information for the new label will be updated in the database (not shown). If the locations are not the same the user will be given a warning message stating that the locations are different and asked if they want to continue posting the new label. If yes, the new label will be registered. If the user tries to post the new label before its effective date they will be given a warning message stating that the label is not supposed to be posted until the effective date and asked if they want to continue. If yes, the new label will be registered. If no is answered to either of the above warning messages no processing will take place.

Label Print Request is to be used in the event the user needs a reprint of a label. The user will be prompted to scan a label. If the barcode is missing and cannot be scanned the user can type in the barcode number. When the process receives the barcode a request accepted message will be displayed on the HHT 54. If the barcode is not available or unreadable the user must press the NO key. The user will then be prompted to enter in the following fields: AISLE, AISLE SIDE, BAY, and SHELF. After the information is received a request accepted message will be displayed on the handheld 54. A record will be created and added to the Label File for forwarding to the enterprise for printing.

The last option under Shelf Management is module 52 Verify. This option is used for verification that the price displayed on the module 52 is correctly placed under the correct product. When module 52 Verify is selected, the user will be prompted to scan the UPC for the item they want to verify. The LED's 135 (FIG. 11) will flash on/off, for example, in succession three times for any module 52 associated what that UPC.

Shelf audit is the process by which auditors can verify that the information at the shelf 46 is correct and current. There are three functions under Shelf Audit: Module Audit, Label Audit, and Ad-Edge Audit.

Module Audit is the same function as Module Verify discussed above.

Label Audit is used to verify the placement of any label, insure that correct space plans are in place and that promotional programs and advertising are in place at the proper time. This audit will be used to spot check label's throughout the store making sure the placement is correct and that posting and removal dates are maintained. The user will select label Audit from the menu and be prompted to scan a label. The label number, location, posting and removal dates will be displayed on the HHT 54. If the removal date has passed the following message will also be displayed: LABEL EXPIRED DD/MM/YY.

AD-EDGE Audit is used to insure that the advertisers have the appropriate advertising running in the current locations in the store at the proper time and that the appropriate amount of shelf space is devoted to their product. The user is prompted on the HHT 54 to Enter Vendor Number. Vendor number, location, UPC number and the advertising expiration date will display. The user can go to that store location and verify that the information is correct.

System Administration is the third process under Shelf Management. It is used to replace module's 52 that are not working and to reboot the gondola controller 48. The two options available are Module Replace and Gondola Controller Reboot. Gondola Controller Reboot allows the user to reboot a gondola controller(s) 48. When this option is selected the user will be asked if the want to reboot all gondola controller(s) 48. If YES is entered all the gondola controller(s) 48 will be rebooted. If no, the user will be prompted to enter in an aisle location. Once the aisle information is entered, the gondola controller 48 will be sent a command to reboot itself. When the gondola controller 48 reboots it requests from the In-Store Processor 32 an address for itself. It will then request a style and a price table. This information will be forwarded to the gondola controller 48. The gondola controller 48 will then forward price information to each module 52 under its control.

Module Replace is used to replace module's 52 that are not working. After the user selects this option, they will unplug the module 52 that is not working. They will then scan the module 52 barcode. On the handheld 54 the location and UPC Number will appear along with a message prompting them to plug in the new module 52. The price information will then appear on the module 52.

The Console process typically gives the user the ability to check the status of the system 30, make database queries, and to perform some of the functions that exist on the handheld 54. The present invention contemplates three main functions, System Status, Table Lookup, and Gondola Controller Reboot.

The System Status function gives the user the ability to check the health of the system 30. There are two options under System Status: Gondola Controller Status and Module Status. If the user selects gondola controller 48 Status a list of all the gondola controller(s) 48 will be displayed along with their status. If any of the gondola controller(s) 48 have a status of module 52 failure the user can scroll to that gondola controller 48 and press the enter key. This will create another window in which the module's 52 for the gondola controller(s) 48 that are having problems will display giving the location and associated product. The user will be able to get a printout of the module's 52 so they can be replaced. The other option module 52 Status gives the user is the ability to display or print a list of all the module 52's in the store that are not working correctly. The user can take the listing along with the handheld device 54 and module's 52 and replace the broken module's 52.

Another function of the Console Process is the Table Lookup function. This option gives the user the ability to view data from the database using different criteria. They have the ability to print the data at any time. In some of the options they have the ability to delete or modify data. The System 30 includes four tables in the System database 32. They are the Space Map, ISE Zone, Label Pending, and the label Deleted table (not shown). The Space Map table is the main table used throughout the System 30. Every item in the store is stored in this table with its location. This table is populated when items are registered to module's 52. When the user selects Table Lookup the four tables above will be listed. To select one the user can use the Up/Down arrows to highlight the one they want or they can enter in the number to the left of the option. In either case, when the cursor is positioned at the desired table the user must press the enter key.

If the Space Map table is selected the user will get a selection criteria screen. The user can view data in this table by location, department, category, or UPC. If Location is selected the user will be given a Location Query screen. They must enter in an Aisle (not shown) at a minimum. If they are not sure of the Aisle designator they can press the Ctrl-A key to get to the Lookup Option. This option will display a list of all the Aisles. The user can scroll through the Aisles until the desired one is found. After the aisle is entered the cursor will be moved to the Side field. The user narrows their search by entering an aisle side. The cursor will then be moved to the Bay and then the Shelf. Once the query is complete the user must press the Ctrl-F keys to save and run the query. What will be displayed is the item number for each item on the shelf, the UPC, and its description. The user can view data by department by selecting department from the selection criteria screen. They will then be prompted to enter a department number. The Category and UPC selection criteria works the same. Regardless of which selection criteria is chosen the same data will be displayed.

The System Zone table lookup will display all the gondola controller(s) 48 that are installed at the store. To populate the table when the store is initially installed, the user must forward a file to the store that contains the Aisle Name, Aisle Side, and an optional descriptive name for the aisle. This file will be read and imported in the table. As gondola controller(s) 48 are installed the user must enter in the gondola controller 48 name and number.

The label Pending table contains a record for all the label's that are to be posted. The records will contain the date the label is to be posted. The table will be populated when the Graphical Edge Creation System 227 exports a file that the user will transmit to the store. The file will be read by an automated process that the user will schedule, that will import the data into the database (not shown). When the user selects this option they will get a screen that will prompt them for a begin and end date. These dates are for the date the label is to be posted. What will be displayed is the label number, location, posting date, and the number of items.

The label Deleted table contains the label's that were deleted. This function is mainly for auditing purposes. It will list the user and the date that a label was removed from the shelf, data can be retrieved by date or user I.D.

There will be System Processes that will be running 24 hours a day. Some will be scheduled to run at specific times, and some will be initiated by other processes. Most of these processes will be running in the background. Some will be programs and some shell scripts. One of these processes that the user can schedule to run is the Label Import process. It will check every 30 seconds to see if Label PENDING file exists in the System 30 directory (not shown). If found it will make a copy of the file in the backup directory (not shown) with a file extension of the Julian date. It will then import the data into the Label Pending Table (not shown). Another process, ISESTYLE, which can be scheduled by the user will look for the existence of a new style table (not shown). If found it will import the table into the database and initiate a process to send the new style table to the gondola controller(s) 48 for forwarding to module(s) 52. There will be a Price Change process that will look for the existence of a price change file (not shown). If found it will initiate a program that will read the file, update and forward the new price information to the gondola controller 48, and acknowledge receipt of the price change. The ISESYNC process will be initiated by CHAINTRACK™. It will create a file of all the prices being displayed on the module 52's in order for CHAINTRACK™ to insure that the data at the point of sale, module 52, and the item database are the same. The ISEX-SRVR process will run 24 hours a day. It will continually check with each gondola controller 48 to determine the health of each. It will ask for a status message. The status message received from the gondola controller 48 will include a checksum of its price and style table. This will be checked with the previous one to make sure that the data is still the same. If different, a new table will be sent to the gondola controller 48. If the gondola controller 48 has any alarm or module 52 failure messages it will be sent to the ISERSVRV process, which will log the message in the error file.

In addition to the real-time information display modules 52, the product information system also provides for the dynamic creation and, display of high quality printed labels 220 to be placed at the shelf 46 as shown in FIG. 11. Although the modules 52 and the printed labels 220 work together to integrate the shelves 46, the labels 220 are not placed on the modules 52. The printed labels 220 are just as modern in their own way as real-time information displays. The labels 220 are created by the product information system 30 using product information imported from the POS database system 34 and the space planning workstation 38 and then printed using a high quality color printer 222 on-site or off-site (FIG. 1). The labels 220 can include professional typefaces in a full range of sizes, color graphics such as logos, photographs, and advertising layouts (not shown). Further, the labels 220 can include an identifier such as a UPC-type code (not shown) so that individual labels 220 can be identified on the shelf using the HHTs 54.

The labels 220 are easier to read, contain more information, and are more professional looking than conventional price labels currently in use. The labels 220 can be created to contain text, lines, rectangles, UPC codes, symbols, and the like. Thus, the labels 220 can be highly customized. Furthermore, the label 220 is as long as its corresponding product's allocated shelf space. This gives the shelf 46 an integrated and finished appearance and it also makes available more space for printed product information and advertising. The labels 220 are an attractive media for enhancing retail store image and point-of-purchase consumer merchandising.

As shown by FIGS. 7, 11 and 12 in combination, the labels 220 are secured to the shelf 46 via placement of the label 220 in the channel 128 of a back plane 82. In this position, the label 220 is protected by the cover 86. When secured to the shelf 46, the labels 220 can also serve as a locator of where to plug in modules 52. The labels 220 can be created with an indicator of where modules 52 are to be plugged in along the shelf 46. If a shelf unit system 66 is not going to be used in conjunction with the labels 220, the labels 220 can be secured to a shelf 46 via any suitable means.

Figure 13:
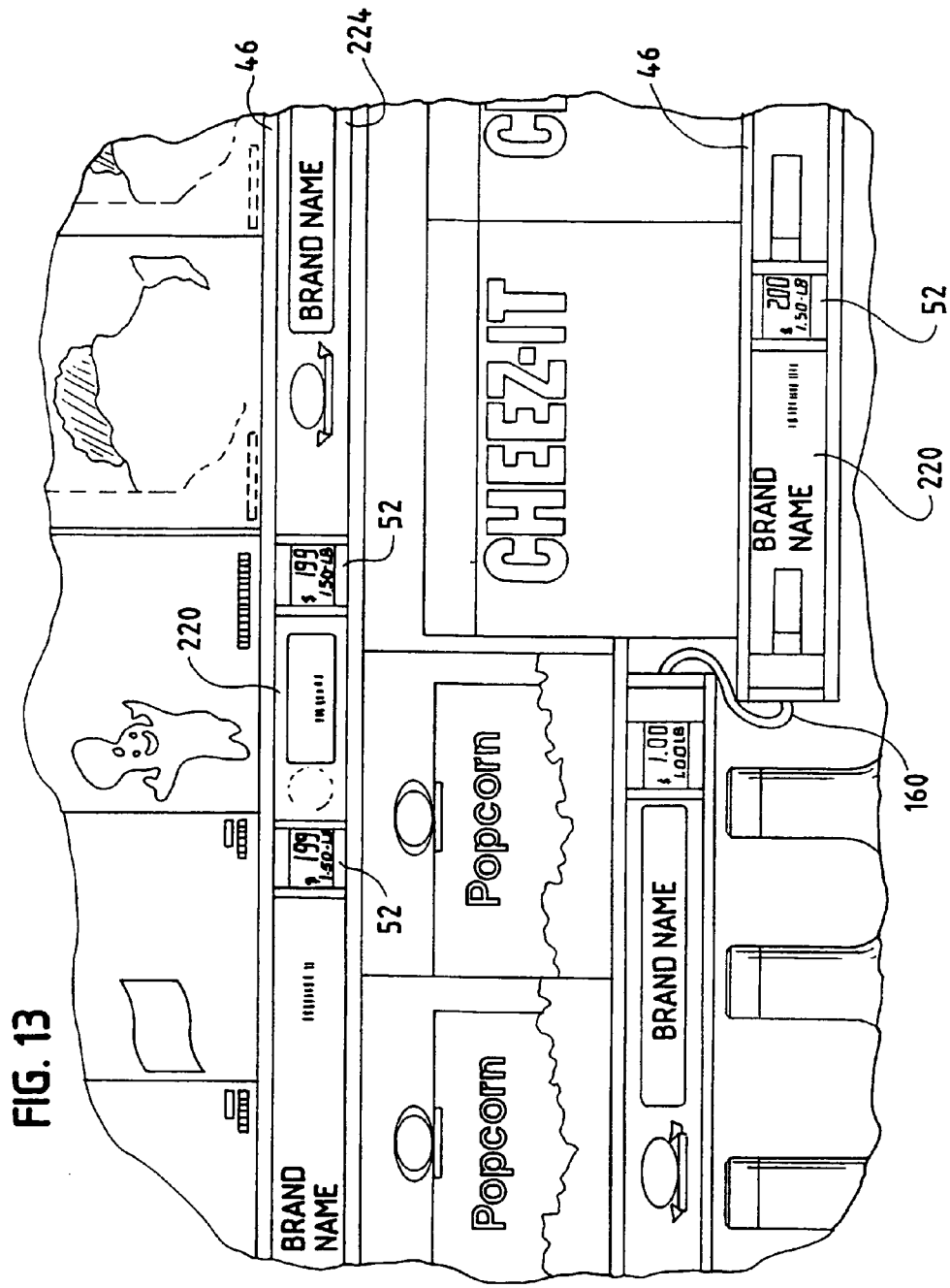
FIG. 13 is a front view of retail gondola shelves having thereon on products, shelf units, modules and labels showing a bus interconnector and cable in use.

Referring now to FIG. 13, when attached to the shelf 46, the labels 220 function as shelf plan-o-grams clearly communicating to store personnel where that corresponding product is to be located or where to restock that product. Preferably, labels 220 for products that are sequentially arranged on each four foot shelf section are printed together on a four foot shelf print band or strip 224. Thus, each four foot shelf section has a corresponding four foot print strip 224. When the print strip 224 is secured to its corresponding shelf 46, the print strip 224 clearly shows a store personnel how the products on that shelf 46 section are supposed to be arranged. The print strip 224 integrity to its corresponding shelf is thereby insured.

Referring now generally to FIGS. 1, 3 and 12, print requests for the labels 220 can be input into the product information system 30 either manually by the user or from a HHT 54 at the shelf 46. Print requests can specify one label 220, a series of labels 220, or a shelf strip 224 by identifying the products or series of products. The printing of labels 220 and shelf strips 224 can either be done at the retail store or at a central location serving many stores.

Preferably, shelf strips 224 are printed by a printing service using equipment such as the Xerox™ 8954 printer which prints in color on 54-inch wide rolls. Preferably, the label print requests are in Postscript® format so that a printing service can directly convert the Postscript files from a disk into printed labels 220 and/or shelf length strips 224.

Figure 14:
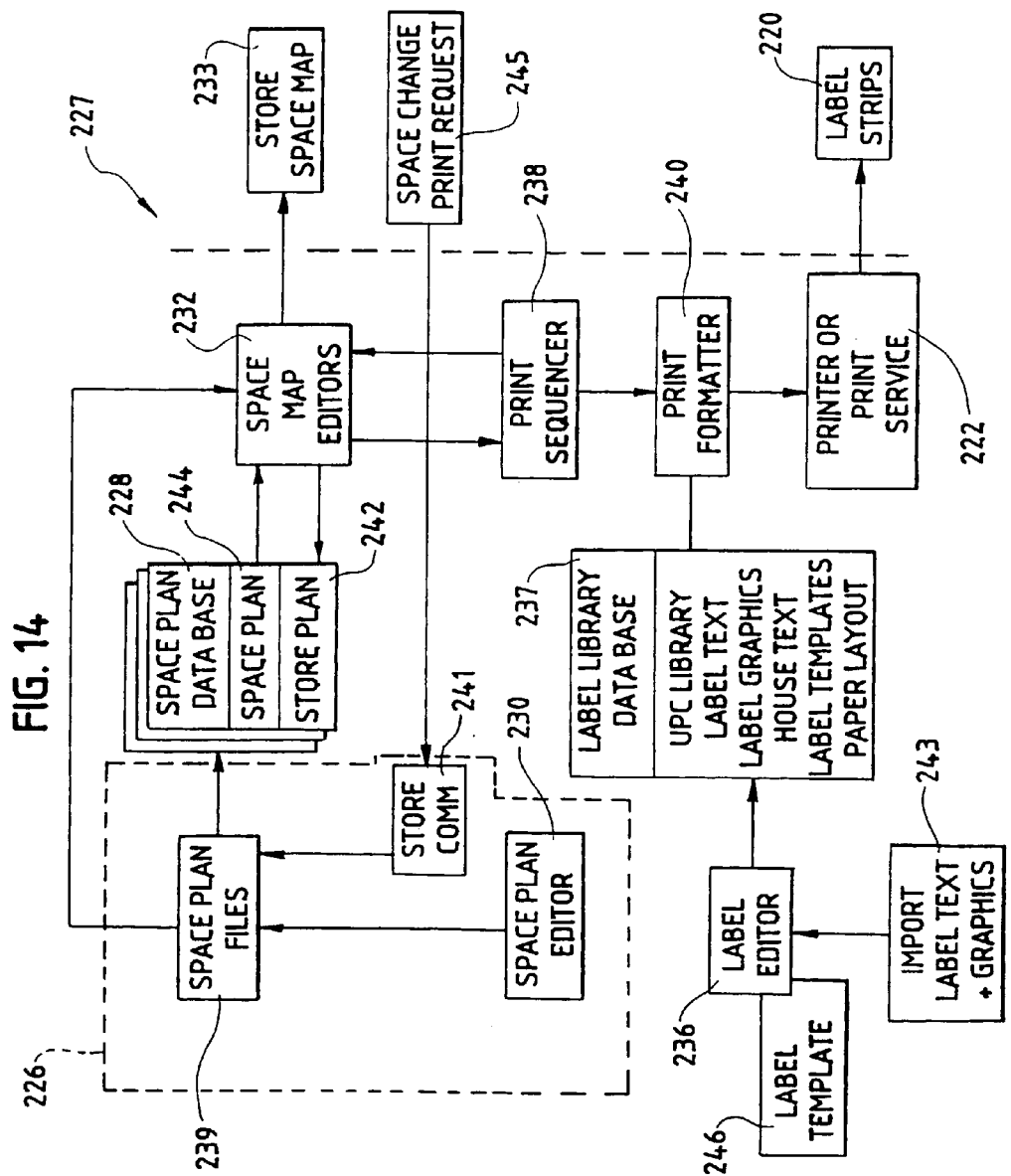
FIG. 14 is a flow diagram of the graphic edge creation system according to the present invention.

The product information system 30 utilizes a graphic edge creation system 227 to create the labels 220 and shelf strips 224. With particular reference to FIG. 14, the graphic edge creation system 227 includes a spaceplan database 228 with associated spaceplan editor 230, a spacemap editor 232, a label library database 237 with associated label editor 236, a print sequencer 238, a print formatter 240 and optionally the printer 222.

Continuing to refer to FIG. 14, the graphic edge creation system 227 is organized around the spaceplan and label library databases 228 and 237 respectively and accesses these databases using SQL commands. The databases 228 and 237 can therefore be shared by multiple workstation users if desired.

The present invention can be utilized by users not desiring the convenience of displaying product information via the modules 52 enabled through the gondola controllers 48. The graphic edge creation system 227 can be utilized in such an instance to create labels 220 and strips 224 showing product information without the use of modules 52. One of ordinary skill can readily appreciate the power of being able to create, print and place at shelf 46 up-to-date, attractive graphical price and/or product information of the present invention.

Turning now to details of the operation of the graphic edge creation system 227, the spaceplan database 228 is a database that tracks the location and the shelf width allocation for every product in the store. The database 228 includes a store plan 242 representing the store's gondolas 44 (FIG. 1) and shelves 46 and includes a store spaceplan 244 representing where each product is located and the amount of shelf space allotted to each product. Much of the data in the spaceplan database 228 can be imported from the space planning workstation 38 (using the spacemap editor 232. The spacemap editor 232 interfaces with the space planning workstation 38 (FIG. 1) to import data and set up the database 233. Alternatively, the store spacemap database 233 can be created or updated right from the shelf 46 using a HHT 54 (FIG. 1). With a HHT 54, an operator can scan products in the order they appear on particular sections of shelf 46 and scan or type in the number the amount of shelf space each product occupies thereby creating the store spacemap database 233.

Figure 15:
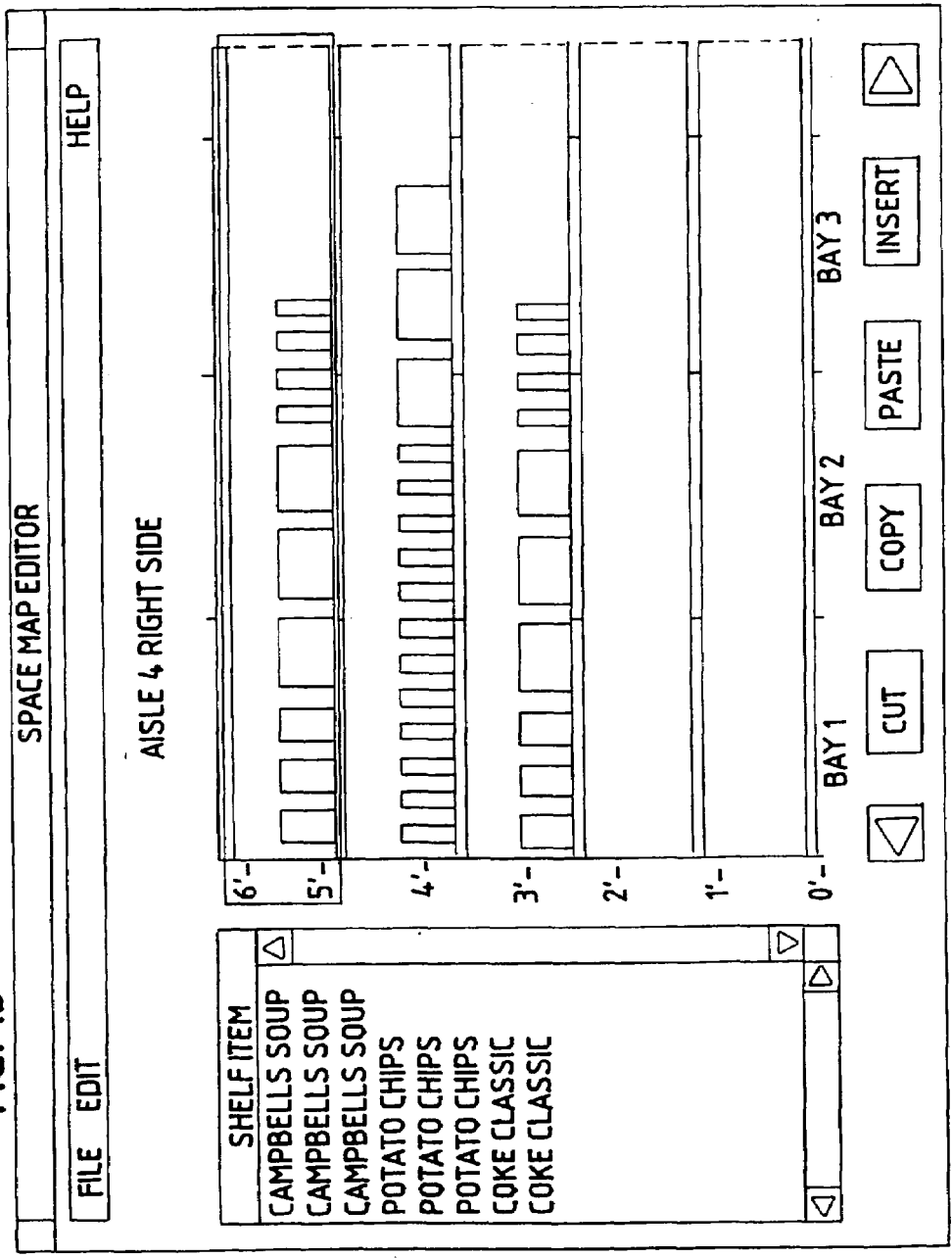
FIG. 15 is a view of the graphical representation of a spaceplan editor display.
Figure 16:
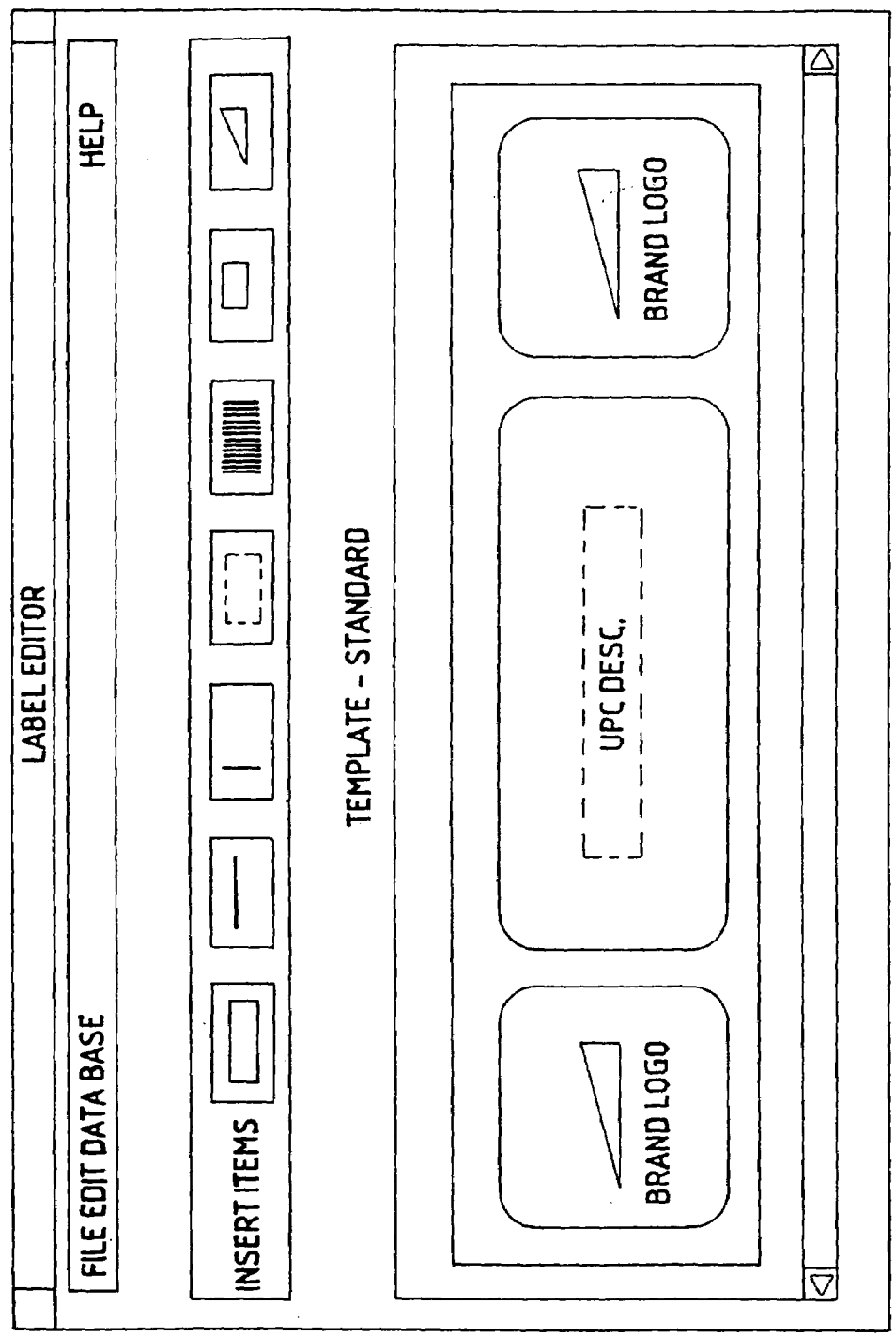
FIG. 16 is a view of the graphical representation of a label editor display.

With reference to FIG. 15, a conventional space plan system 226 has a spaceplan editor 230 which further provides a graphical user interface to the spaceplan database 228 which is used to locate and view the layout of any section of shelf 46 (FIG. 12). The spaceplan editor's 230 graphical representation of a shelf plan helps the user visualize the extent of fit problems and navigate to areas to be changed. Depending upon the limitations of the monitor (not shown) upon which the graphical representation is being viewed, the representation may be scaled to show one or more shelf sections with not enough resolution to show the names of each product. In this circumstance, a simultaneous text display is provided listing the products in shelf order. As the user moves about the graphical representation, the graphic and text views move synchronously. The spaceplan editor 230 also shows invalid conditions, for example five feet of products in four feet of space.

The graphical user interface of the spaceplan editor 230 is further used to do basic editing of the store's spaceplan 244. With the spaceplan editor 230, editing operations such as select, cut, copy and paste can be performed in either the graphics or text views with the results visible in both. Cut and paste editing is provided for easy trial product arrangements.

The spaceplan 244 often has a ripple effect on the placement or fit of adjacent products. The spaceplan editor 230 enables the management and minimization of the ripple effects in that the editor's graphical display aids the user in visualizing how far the ripple extends and interactively shows the effect of increasing/decreasing product shelf space allocation.

According to the present invention the spacemap editor 232 supports editing many "similar but not identical" space maps 233 for a chain of retail stores. The space planner for a chain of stores often must add a product to a specific area in numerous stores, however, the shelf positions and space allocation for that product will vary from store to store. Copy and paste editing streamlines such repetitive work.

The spacemap database 233 uses a coordinate system for identifying the location of products. The coordinate system facilitates editing, sorting and indexing of products in the order they appear on shelves 46. Each product's location is represented by a four-part address including the fields ZONE, BAY SHELF, and SEQUENCE. A ZONE is a store arrangement of 1 to N bays, freezers, islands etc., that are contiguous, usually for store convenience. A bay is a horizontal dimension related to the standard shelf section four foot increments. Bay 1 is at the left end of an aisle-side and increases by 1 for each standard shelf length of four feet. Sequence is an abstract horizontal dimension specifying where a product is located along a standard bay. The leftmost item on a particular four foot shelf is given a sequence number of 1. The next product to the right is initialized to 2, etc.

Referring back to FIG. 14, the spacemap editor 232 of the graphic edge creation system 227 extracts information from the spaceplan database 228 as needed for creating and printing labels 220. The spacemap editor 232 produces the gondola print files that are employed during mass registration of modules. The spacemap editor 232 uses the level dimension to produce lists of products in shelf sequence. The spacemap editor 232 also determines the order in which to print labels 220.

The label library database 237 contains label templates and the text and graphics that can appear on a label 220. The label editor 236 is used to import or create all the files in the label library database 237. Those files typically include a UPC library file, label text files, label graphics files, a house text file, a house graphics file, a label templates file and a paper layout file.

The UPC library contains data about the products by UPC code. Preferably, the minimum information is the UPC code, units and units of measure (20.5 OZ), text that describes the product ("Betty Crocker™ Brownie Mix"), and the width of the product in inches. This information is available from the space planning workstations 38.

The label tables are indexed by UPC code and contains product-specific text. Preferably, there is a different label text file for each type of text called for by the label templates such as brand, product name, size, SKU, etc. These files can be imported from the POS database system 34 or other product information files (not shown) and/or created and edited with the label editor 236.

The label tables provide the graphics information by UPC code. The label graphics files can be created with commercial software and/or external scanners and/or imported in a variety of standard graphics formats.

The house table and the house graphics files are provided for "house" text and graphics respectively which is text or graphics that is not specific to any product.

As shown in FIG. 15 in light of FIG. 14, the label templates file contains numerous standard label templates which determine the general layout of information on a label 220. The standard templates lengths are adjustable so that labels 220 can be custom-fitted for different products and different store layouts. If a shelf strip 224 is utilized, adjacent labels 220 do not have to use the same template.

The label editor 236 also includes a label template editor 246 with a typical WYSIWYG™ graphical user interface. The interface enables the user of the graphic edge creation system 227 to create custom templates with a specific appearance, text, lines, rectangles, graphics and UPC codes. The label editor 236 is used to assign a label template, either standard or custom, to each product in the store.

When creating a custom template, the label template editor 246 represents the label 220 as a rectangle of a default color such as gray. The graphical interface may not be able to show the entire label length hence a horizontal scroll capability may have to be used. The user may change the length of the label 220 to anything desired length to correspond to the amount of shelf space a product has been allotted. The user may also change the color of the label 220 to any available color.

Further, the user can place rectangles anywhere on the label 220. For example, the rectangles can be square-cornered or round-cornered, with varying border line widths. The border lines can be any color and the rectangle interior can be blank or filled in with any color. In addition to their visual functions, the rectangles have a special attribute that is used to make labels of variable length. The attribute is termed the elastic property. If a rectangle's elastic property is enabled, then the rectangle and all objects contained within it will be automatically adjusted as necessary to make variable-length labels 220. The horizontal dimension of the rectangle will be expanded to make the label 220 fit the required dimension. Text, UPC codes and graphics within an elastic rectangle are not stretched because this would distort their appearance, but their location is scaled so the overall layout expands. If a graphic is placed one inch from the left edge of an elastic rectangle, and the user wants to double the rectangle length, then the graphic will be placed two or more inches from the left edge of the stretched rectangle. An elastic rectangle is displayed on the graphical interface with a symbol (//) in the center of its top and bottom lines.

The elasticity of a rectangle is defined by its outer rectangle. However, a rectangle placed within an outer rectangle can also be either elastic or fixed. As a default, any inner rectangle is set to the same elasticity setting as its surrounding outer rectangle so that the inner rectangle will automatically expand or contract with the outer elastic rectangle. Inner fixed rectangles do not expand or contract.

The user can place horizontal or vertical lines anywhere on the label 220 with control over line width and color. Vertical lines are not affected by elasticity of rectangles.

Horizontal lines can be set to be elastic or not. If the elastic property is enabled, line length will scale proportionally with the enclosing elastic rectangle.

Figure 17A:
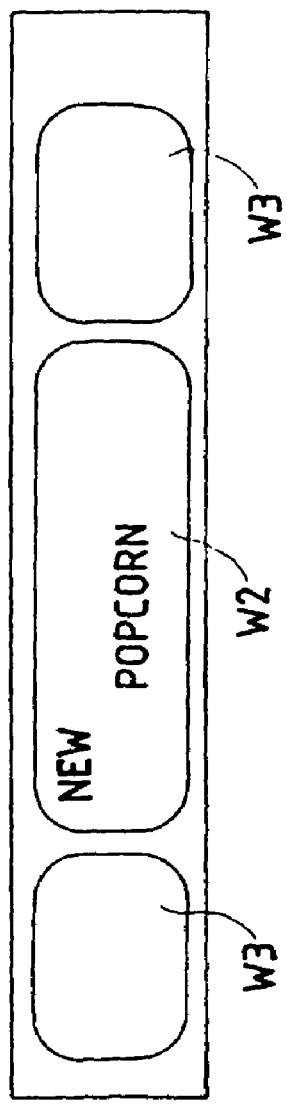
FIGS. 17a and 17b are plan views of product shelf edge labels in accordance with the present invention.
Figure 17B:
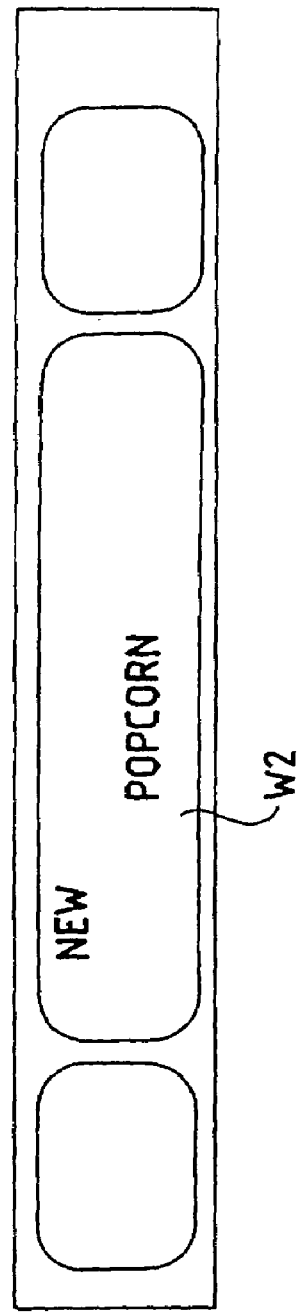

Referring to FIGS. 17a and 17b, rectangle W2 in FIG. 17a is elastic and was expanded in FIG. 17b to make the overall label length match a particular shelf space allotment. The text that says "NEW" was left-aligned so its left edge is shifted by the scaling. The text that says "POPCORN!" was center-aligned so its center is shifted by the scaling. The overall result preserves the original layout while expanding portions of to fill the desired amount of space.

The elastic or stretching ability of the rectangles can be unattractive if stretching goes beyond of factor of about three of four. A maximum stretch property can be set as a limit on the elasticity of the rectangles. However, if a label 220 longer than a stretch factor of three or four is desired, an additional variable-width technique is provided using a duplication attribute. The duplication attribute can be enabled for any rectangle not just elastic ones. The duplication attribute duplicate rectangles to make a label 220 longer. For example, referring to rectangles W3 in FIG. 17a, the graphic of the store name is duplicated as required, putting any number of copies of the store name off to the right to make the label 220 longer.

Non-elastic rectangles as shown in FIG. 18 can be used to contain predictable store-operations information such as a reorder number and/or UPC code. When the label 220 is stretched to a new length, non-elastic rectangles do not change dimensions.

In addition to rectangles, the user has control of, for example, color, text, lines, UPC codes, modules indicators and graphics as shown in FIG. 13. If colors are not specified, a default color scheme is used on the labels. The user can place a text field anywhere on the label 220. For each text field, the user can set attributes such as font, font size, italic and bold options, text color, and the like. The text field is represented on-screen by a dotted rectangle called a field box. The field box height is controlled by the font setting and it is drawn to reflect the height of any possible text ascenders and descenders. This provides the user with assurance that fields that do not overlap vertically on the graphical representation will not overlap vertically in print.

Field box length is set by the user. The user should generally make text fields as wide as possible to indicate the permitted extent of text or other field contents. Each text field can be set as left-, center- or right-aligned, with the appearance of the field box indicating which setting is in effect. The alignment setting will determine how the ultimate text is positioned with respect to the field box. The alignment setting lets the user control whether related text fields align to the right, to the left, or both for centered text. If several lines of text are all left-aligned, then even if they are within an elastic region, their alignment will be preserved. As the region is expanded, the left edge point of the text is moved proportionally.

A text field can contain fixed text that will always be printed as part of the label 220. Fixed text fields are given a two-part field name, such as "UPC.DESC" or "UPCLIB.REORDER". The first part names a database table and the second part names a field within that table. The two part name is used by the print formatter 240 to look up the data to be included.

Regarding lines in the templates, the user can place horizontal or vertical lines anywhere on the label 220 with control over the line width and color. Vertical lines are not affected by elastic regions. Horizontal lines can be set as elastic or not. If the elastic property of horizontal lines is enabled, the line length will scale proportionally with the elastic region.

The user can place a UPC code field anywhere on the label 220. The UPC code height can be specified and printed with or without equivalent text. Every UPC code field has a two-part field name that is used by the print formatter 240 to look up the data to be included.

One or more module location indicators can be placed anywhere along the label 220. The indicators are shaped as a rectangle and are intended to reserve a fixed amount of space along the label 220 for one or more modules 52. The indicators appear on the label 220 as a guide for plugging in modules 52. If modules 52 are utilized of different sizes, provisions exist for specifying which model/size of module 52 is to be used. For a given module model/size, the dimensions of the module location indicator are fixed to match the module 52 and do not stretch even if located within an elastic rectangle.

The user can place graphics fields anywhere on the label 220. The actual size of the printed graphic will be determined by the graphics file not the field box size. Each graphics field can aligned left-, center- or right- both horizontally and vertically. Images of any length can be placed into the field, and the alignment setting will determine how the actual image is positioned with respect to the field.

Graphics can be a fixed part of the label 220. As such, they are specified as a file name that will immediately be read into the label 220 and displayed. Alternatively, the fixed graphics could be included in the template definition file so the original graphics file would not have to be present at the time of printing. Graphics that will be filled in automatically when the label 220 is printed are given two-part field names such as "UPC.DESC" or "HOUSE.LOGO". The first part names a database and the second part a field within that database. The print formatter 240 looks up a graphics file name in the designated database. This indirect look up allows graphics relating to a particular product to be easily changed by changing the file name in the database.

The label editor 236 (FIG. 14) does not have to understand or recognize the field names used in text, UPC code and graphics files. The label editor 236 merely retains the field names as entered so the overall organization of the label information can be flexible and changed without having to make any changes to the template editor 246. Further, the label editor 236 includes straightforward data entry/editing screens for all of the data in the label library database 234. The screens are used to assign a template to a product and to enter the text elements and graphics file names that are to be used with a template.

Referring back to FIG. 14, the graphic edge creation system 227 includes the print sequencer 238 which controls the process of printing labels 220. Print requests from the user can specify one shelf up to an entire zone or store. Each print request produces a label 220 for one shelf. The print sequencer 238 accomplishes this by feeding the starting shelf. The spacemap editor 232 responds with a label specification which corresponds with the length of the shelf label 220. The print sequencer 238 then issues the print request that says, in effect, "Print a label for the shelf containing these products requiring this much shelf space". The print request may also state "This is the end of a strip" to control multiple template compositing. Print requests will be discussed in more detail with respect to the print formatter 240.

When printing a range of adjacent labels 220, the print sequencer 238 asks the spacemap editor 232 for the "next"

product UPC code. The spacemap editor 232 determines what product is just to the right of the one that just had its label printed and returns a label specification for it. This process continues from product to product down a shelf 46 as far as requested.

The print formatter 240 of the graphic edge creation system 227 determines how one or many label 220 or shelf strips 224 of labels 220 are to be printed on the paper size preselected by the user. The template editor 246 saves the selected paper size in a file that is used by the print formatter 240. The print formatter 240 can either print one label 220 or a shelf strip 224 on one sheet of paper or it is capable of printing multiple labels 220 or shelf strips 224 on larger paper rolls.

The print requests instruct the print formatter 240 what to do. Each print request contains the following information: a UPC code, a label template name, a label length, and an end flag. The UPC code is used to look up the information to be printed. The label template name establishes the layout of the label 220 by specifying the types and positions of information to be printed. The label length is used if the product's template permits variable lengths. The end message raises a flags signaling that the label 220 is the last of a series of labels. If the flag does not say end message, then the current label will not actually print until subsequent labels 220 fill a paper sheet or the end of a shelf strip 224.

The print formatting process for each product is controlled by the template specified. Templates are built ahead of time with the template editor 246 and contain the desired layout of the label 220. In response to a print request, the print formatter 240 gets the specified label template. The fields in the template specify the kind of data to be filled in. The print formatter 240 gets the data from the label library database 237 and fills it in.

We claim:

1. A printed label and a display shelf of a business establishment, the combination comprising:
    a display shelf having a first length and at least one area on which at least one product is to be placed, the area having a second length and a depth; and
    a label, comprising:
    i) product information printed thereon for identifying the at least one product for display on the shelf, and
    ii) first and second space indicators for indicating a position, corresponding to a portion of the first length of the shelf, at which the at least one product is to be placed, the label being constructed and arranged to have a defined predetermined length that is coextensive with the second length of the shelf on which the at least one product is to be placed, the first and second space indicators being printed on the label and defining the predetermined length, and the first space indicator indicating where the second length of the shelf begins and the second space indicator indicating where the second length of the shelf ends.

2. The combination according to claim 1, wherein the product information includes at least one of a machine readable code of the at least one product, a color, a name of the at least one product, a price of the at least one product, a machine readable code corresponding with the price of the at least one product, graphics related to the at least one product, a logo, an advertisement, a machine readable code for identifying the location of the shelf in the business establishment, a coupon, or a promotion.

3. The combination according to claim 2, wherein the location of the shelf in the business establishment comprises at least one of a store, aisle, aisle-side, bay, section, shelf, or spacemap coordinate.

4. The combination according to claim 1, wherein the defined predetermined length substantially corresponds to the entire length of the shelf.

5. The combination according to claim 1, wherein the product information separately identifies a plurality of products for display on separate areas of the shelf, and wherein at least first and second space indicators are provided for each of the plurality of products.

6. A printed label and a display shelf of a business establishment, the combination comprising:
    a display shelf having a first length and at least one area on which at least one product is to be placed, the area having a second length and a depth; and
    a label having a length substantially corresponding to the entire first length of the display shelf; the label further comprising:
    i) first product information printed on the label for identifying a first product;
    ii) second product information printed on the label for identifying a second product; and
    iii) first space indicators for indicating a beginning position and an end position, corresponding to a portion of the second length of the shelf, at which the first product is to be placed, and second space indicators for indicating a beginning position and an end position, corresponding to another portion of the second length of the shelf, at which the second product is to be placed, wherein the first and second space indicators are printed on the label.

7. The combination label according to claim 6, wherein the first product information and second product information each include at least a name of a respective product, and at least one of a price, a color, a machine readable code, graphics associated with the respective product, an advertisement, a coupon, or a promotion.

8. A method for creating labels for display shelves of a business establishment, comprising:
    providing planogram information of products for display in one or more areas of a business establishment, wherein the planogram information includes information identifying products for display and identifying a corresponding horizontal dimension of shelf space required for displaying each product on a shelf;
    providing information related to a predetermined number of shelves and the corresponding horizontal dimension of shelf space for the one or more areas for displaying the products identified by the planogram information;
    apportioning the products identified by the planogram information to one or more of the predetermined number of shelves based on the corresponding horizontal dimension of shelf space required for displaying each product;
    printing a label for one or more shelves of the predetermined number of shelves, wherein label information printed on each label identifies one or more products to be displayed on a respective shelf, the label being a defined predetermined length that is coextensive with the entire horizontal dimension of the area of the space allocated on the shelf for arranging a product thereon, the label including first and second space indicators being printed on the label and defining the predetermined length, the first space indicator indicating where the length of the area of the space allocated on the shelf for arranging the product begins, and the second space indicator indicating where the length of the area of the space allocated on the shelf for arranging the products ends.

9. The method according to claim 8, wherein the labels are printed by a printing service.

10. The method according to claim 8, wherein the planogram information includes a machine readable code for each product to be displayed in the area of the business establishment.

11. The method according to claim 8, wherein the label information includes a machine readable code for each product or a machine readable code for the label.

12. The method according to claim 8, wherein the information printed on a respective label includes information for identifying each product for display on a respective shelf and one or more space indicators for each product for indicating a position for the product on the shelf.

13. The method according to claim 8, further comprising obtaining from a database additional product information which may be included on the label.

14. The method according to claim 8, wherein the information printed on each label includes control information for locating the respective shelf of the business establishment for attaching the respective label thereto.

15. The method according to claim 14, wherein the control information comprises a machine readable code and/or information related to at least one of an area of the establishment, an aisle of the establishment, a gondola of the establishment, a bay of the establishment, or a shelf of the establishment.

16. The method according to claim 13, wherein the additional product information includes at least one of a price of at least one product, a color, a name of the at least one product, graphics related to the at least one product, a logo, an advertisement, a coupon, or a promotion.

17. The method according to claim 8, wherein the labels are printed in planogram shelf-space order.

18. The method according to claim 17, wherein the order of the printed labels is selected from the group consisting of: left to right, right to left, top to bottom, bottom to top, and measured increments.

19. The method according to claim 8, wherein the business establishment is selected from the group consisting of: a single store, a single store of a chain of stores, and multiple stores of a chain of stores.

20. The method according to claim 8, wherein an area of a business establishment comprises either a portion of the business establishment or the entire business establishment.

21. A method of stocking shelves for a business establishment comprising:
providing at least one shelf with a printed label comprising information for identifying at least one product for display on the at least one shelf, wherein the label includes first and second space indicators for the at least one product identified by the information for indicating a first length of the at least one shelf for arranging the at least one product thereon, the label being formed to be a defined predetermined length that is coextensive with the first length, the first and second space indicators being printed on the label and defining the first length, and the first space indicator indicating where the first length begins and the second space indicator indicating where the first length ends; and
stocking the at least one shelf according to the information and the first and second space indicators.

22. A display shelf for a business establishment, comprising:
a substantially horizontal support for displaying one or more products for sale by a business establishment;
an affixing area for affixing a printed label thereto; and
a printed label comprising:
information printed on the label for identifying at least one product for display on the shelf, and
the label including first and second space indicators for the at least one product identified by the information for indicating a first length of the support for arranging the at least one product thereon, the first and second space indicators being printed on the label and defining the first length, and the first space indicator indicating where the first length begins and the second space indicator indicating where the first length ends.

23. The shelf according to claim 22, wherein the information includes at least one of a machine readable code of the at least one product, a color, a name of the at least one product, a price of the at least one product, graphics related to the at least one product, a logo, an advertisement, a coupon, or a promotion.

24. The shelf according to claim 22, wherein the label has a length that substantially corresponds to the entire length of the support.

25. The shelf according to claim 22, wherein the information identifies a plurality of products for display on the shelf, and wherein at least one space indicator is provided for each of the plurality of products.

26. The shelf according to claim 22, further comprising a protective cover placed over an edge of the shelf.

27. A shelf edge label system for creating a shelf label for a business establishment, comprising:
a database comprising planogram data for an area of a business establishment, wherein the database includes spacemap data for a product display area of the business establishment; and
a label editor for creating and editing one or more labels for affixing to one or more display shelves using at least one of the planogram data and spacemap data; and
a printer for printing the one or more labels, wherein the one or more labels include printed information for one or more products, and wherein each label is constructed and arranged to be a defined predetermined length that is coextensive with an entire horizontal dimension of an area of space allocated on a shelf for arranging a corresponding product thereon, the label including first and second space indicators being printed on the label and defining the predetermined length, and the first space indicator indicating where the predetermined length begins, and the second space indicator indicating where the predetermined length ends.

28. The according to claim 27, wherein the spacemap data is contained in a second database.

29. The system according to claim 27, further comprising a label library.

30. The system according to claim 27, wherein the planogram data comprises data for tracking one or both of a location and a shelf space allocation for one or more products displayed by the business establishment.

31. The system according to claim 27, wherein the spacemap data includes information related to a store product floor plan.

32. The system according to claim 31, wherein the store product floor plan comprises an arrangement of at least one of one or more gondolas and one or more display shelves.

33. The system according to claim 29, wherein the label library comprises at least one of: one or more label templates, text for use on labels, graphics for use on labels, or machine readable code data associated with one or more products.

34. The system according to claim 33, wherein the machine readable code data comprises at least one of: a code for each product, a code for control information for a respective label, units and/or units of measure for each product, descriptive text for each product, a price for each product, a logo, a dimension of each product, or graphics related to each product.

35. The system according to claim 34, wherein the dimension comprises a width of the corresponding product.

36. The system according to claim 27, further comprising a spaceplan editor having a graphical user interface to locate and/or view a layout of one or more sections of the business establishment.

37. The system according to claim 27, wherein the planogram information includes coordinate information relating to coordinates for identifying the location of one or more products displayed on a shelf in the business establishment.

38. The according to claim 37, wherein the coordinate system includes address data for each product comprising information corresponding to at least one of a zone, a bay, a shelf, or a sequence.

39. The system according to claim 38, wherein zone data comprises data directed to at least one contiguous bay, freezer, aisle, or island area.

40. The system according to claim 38, wherein bay data comprises data directed to a horizontal dimension related to a shelf section.

41. The system according to claim 38, wherein the sequence data relates to data directed to a horizontal dimension specifying the location of a product in a bay or on a shelf.

42. The system according to claim 27, further comprising a spacemap editor for interfacing the system with a space planning system to obtain spacemap data.

43. The system according to claim 27, further comprising a print sequencer for controlling a process for printing labels.

44. The system according to claim 43, wherein the print sequencer issues print requests to the system by specifying products associated with respective labels for printing.

45. A computer readable medium encoded with a data structure and a computer program, wherein the computer program uses the data structure for identifying and organizing products displayed by a business establishment, the data structure comprising:

a first field representing data related to an arrangement of one or more display shelves of a business establishment;

a second field having information representing a horizontal dimension of a display shelf length of a corresponding display shelf;

at least one third field having information related to at least one product for display on the corresponding display shelf permitting a printed label to be constructed and arranged to have a defined predetermined length that is coextensive with a length of an area of space allocated on the shelf for arranging the at least one product thereon, the label including first and second space indicators being printed on the label and defining the predetermined length, and the first space indicator indicating where the predetermined length begins, and the second space indicator indicating where the predetermined length ends; and a fourth field representing a sequence number specifying the location of the at least one product along the display shelf.

46. A method for printing labels for product display shelves comprising:

issuing a print request to a print formatter for printing one or more labels for one or more display shelves of a business establishment, wherein each print request comprises at least one of a machine readable code, a label template name, a label length and an end flag;

retrieving information to include on the label using the machine readable code;

establishing a layout of the information for including on the label using the named template;

establishing a length of the label substantially corresponding to a horizontal dimension of a display shelf allocated to a product for which the label is affixed; and printing the one or more labels to a defined predetermined length that is coextensive with the entire horizontal dimension of the area of the space allocated on the shelf for arranging the product thereon, the label including first and second space indicators being printed on the label and defining the predetermined length, and the first space indicator indicating where the predetermined length begins, and the second space indicator indicating where the predetermined length ends.

47. The method according to claim 46, wherein the print requests are issued from a workstation or a hand-held portable terminal.

48. A method for reducing labor for a business establishment, comprising:

providing each shelf of a plurality of display shelves in a business establishment with a corresponding printed label having a length substantially corresponding to the length of a respective shelf, wherein the label comprises printed information for identifying at least one product for display on the shelf and first and second space indicators for the at least one product identified by the information for indicating at least one of a corresponding area of space allocated on the shelf for arranging the at least one product thereon and a position for the at least one product on the shelf, the printed label being formed to a defined predetermined length that is coextensive with the entire horizontal dimension of the area of the space allocated on the shelf for arranging the at least one product thereon, the first and second space indicators being printed on the label and defining the predetermined length, and the first space indicator indicating where the predetermined length begins, and the second space indicator indicating where the predetermined length ends; and stocking the plurality of display shelves according to the corresponding shelf labels.

49. A method for allocating products to display shelves of a business establishment comprising:

providing planogram information of products for display in an area of a business establishment, wherein the planogram information includes product information identifying products for display in the business establishment; and identifying a corresponding horizontal dimension and location of shelf space available for displaying each of the products;

providing information related to a plurality of shelves of the business establishment, the information including the corresponding lengths of the plurality of shelves for displaying products;

allocating the products to the plurality of shelves; and forming labels with printed product information thereon, each label being formed to a defined predetermined length that is coextensive with the entire horizontal dimension of an area of space allocated on a shelf for arranging a corresponding product thereon, the label including first and second space indicators being printed on the label and defining the predetermined length, and the first space indicator indicating where the predetermined length begins, and the second space indicator indicating where the predetermined length ends.

50. The method according to claim 49, further comprising printing a label for at least one of the plurality of shelves using the corresponding product information of products allocated to the respective shelves.

51. The method according to claim 49, further comprising providing the corresponding product information for the products allocated to the plurality of shelves via a computer network.

52. The method according to claim 51, wherein the corresponding product information includes location identification information comprising the location of the respective shelf in the business establishment.

53. A method for locating a product for purchase in a business establishment using a computer system, comprising:

inputting a name of the product for purchase into the computer system;

identifying the location in the business establishment of the product;

generating a report listing the location of the product; and locating the product by identifying printed labels attached to a shelf on which the product is located, the label being formed to a defined predetermined length that is coextensive with the entire horizontal dimension of an area of space allocated on the shelf for arranging the product thereon, the label including first and second space indicators being printed on the label and defining the predetermined length, and the first space indicator indicating where the predetermined length begins, and the second space indicator indicating where the predetermined length ends.

54. A method for auditing products of display shelves of a business establishment comprising:

providing a plurality of display shelves with a label, wherein the label includes a first machine readable code for identifying the label, the label being formed to a defined predetermined length that is coextensive with the entire horizontal dimension of space allocated on a shelf for arranging a respective product thereon, the label including first and second space indicators being printed on the label and defining the predetermined length, and the first space indicator indicating where the predetermined length begins, and the second space indicator indicating where the predetermined length ends;

providing a handheld scanner in communication with a database, wherein the database includes a first field containing the machine readable code for a label and a second field containing the location of that label within a business establishment;

scanning the first machine readable code of a first shelf label; and displaying, on the scanner, the information contained in the second field.

55. A computer readable medium encoded with a data structure and a computer program, wherein the computer program uses the data structure for identifying and organizing products displayed by a business establishment, the data structure having a first field containing identification information for a label for corresponding product display shelf information of a business establishment and including information for determining the length of the label so that that label may be constructed and arranged to a defined predetermined length that is coextensive with the entire horizontal dimension of an area of space allocated on a shelf for arranging the product thereon, the label including first and second space indicators being printed on the label and defining the predetermined length, and the first space indicator indicating where the predetermined length begins, and the second space indicator indicating where the predetermined length ends; and a second field associated with the first field containing an expiration date for the label.

56. The computer readable medium according to claim 55, further comprising a third field associated with the first field containing a posting date for the associated label.

57. The computer readable medium according to claim 55, further comprising a third field associated with the first field containing advertisement information for the label.

58. The computer readable medium according to claim 57, further comprising a fourth field associated with the third field containing an expiration date for the advertisement.

59. The computer readable medium according to claim 57, further comprising a fourth field associated with the third field containing a posting date for the advertisement.

60. A method for creating labels for display shelves of a business establishment, comprising:

providing planogram information of products for display in one or more areas of a business establishment, wherein the planogram information includes information identifying products for display and identifying a corresponding horizontal dimension and location of shelf space required for displaying the products;

providing information related to a predetermined number of shelves and the corresponding horizontal dimension of the shelf space for the one or more areas for displaying the products identified by the planogram information;

apportioning the products identified by the planogram information to one or more of the predetermined number of shelves based on the corresponding horizontal dimension of shelf space required for displaying each product;

printing a label for one or more shelves of the predetermined number of shelves, wherein label information printed on each label identifies one or more products to be displayed on a respective shelf, and the label being formed to be a defined predetermined length that is coextensive with the entire horizontal dimension of the area of the space allocated on the shelf for arranging a product thereon, the label including first and second space indicators being printed on the label and defining the predetermined length, and the first space indicator indicating where the predetermined length begins, and the second space indicator indicating where the predetermined length ends.

61. A printed label and a display shelf of a business establishment, the combination comprising:

a display shelf having at least:
- i) a first area on which a first product is to be placed, the first area having a first length and a first depth; and
- ii) a second area on which a second product is to be placed, the second area having a second length and a second depth;

the label comprising:
- i) first product information printed thereon for identifying the first product, and second product information for identifying the second product;
- ii) indicators for indicating:
  - a) a first portion of a length of the label corresponding to the first length; and
  - b) a second portion of the length of the label corresponding to the second length;
- iii) the indicators including:
  - a) a first space indicator and a second space indicator being printed on the label for indicating the first portion, where the first space indicator indicates where the first portion of the first length begins and the second space indicator indicates where the first portion of the first length ends; and
  - b) a third indicator, for use with the second indicator for indicating the second portion, where the second indicator indicates where the second portion of the second length begins and the third indicator indicates where the second portion of the second length ends.

* * * * *